United States Patent
Gniadek

(10) Patent No.: US 10,396,512 B2
(45) Date of Patent: Aug. 27, 2019

(54) CONNECTOR SYSTEM WITH INTERCHANGEABLE CONNECTOR MODULES FOR OPTICAL FIBERS, ELECTRICAL CONDUCTORS, OR BOTH

(71) Applicant: SENKO ADVANCED COMPONENTS, INC., Marlborough, MA (US)

(72) Inventor: Jeffrey Gniadek, Northbridge, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/693,842

(22) Filed: Sep. 1, 2017

(65) Prior Publication Data

US 2017/0365962 A1    Dec. 21, 2017

Related U.S. Application Data

(63) Continuation of application No. 14/812,232, filed on Jul. 29, 2015, now Pat. No. 9,755,382.

(60) Provisional application No. 62/133,085, filed on Mar. 13, 2015.

(51) Int. Cl.

| G02B 6/38 | (2006.01) |
| H01R 13/64 | (2006.01) |
| H01R 13/625 | (2006.01) |
| H01R 24/66 | (2011.01) |
| H01R 24/20 | (2011.01) |
| H01R 24/00 | (2011.01) |

(52) U.S. Cl.
CPC .......... *H01R 24/66* (2013.01); *G02B 6/3817* (2013.01); *G02B 6/3879* (2013.01); *H01R 13/625* (2013.01); *H01R 13/64* (2013.01); *H01R 24/20* (2013.01); *G02B 6/3894* (2013.01)

(58) Field of Classification Search
CPC ... G02B 6/3825; G02B 6/4293; H01R 13/426
See application file for complete search history.

(56) References Cited

U.S. PATENT DOCUMENTS

| 3,617,614 | A | * | 11/1971 | Henry | H01B 17/306 174/652 |
| 4,953,929 | A | * | 9/1990 | Basista | G02B 6/3874 385/55 |
| 5,123,071 | A | * | 6/1992 | Mulholland | G02B 6/3831 385/53 |
| 5,348,349 | A | * | 9/1994 | Sloane | F16L 19/005 285/86 |

(Continued)

OTHER PUBLICATIONS

International Search Report and Written Opinion from Application No. PCT/US2015/057610, dated Jan. 21, 2016, 9 pages.

(Continued)

*Primary Examiner* — Rhonda S Peace
(74) *Attorney, Agent, or Firm* — Edward S. Jarmolowicz, Esq.

(57) ABSTRACT

A modular connector system for various types of different fiber optic and/or electrical connectors may include a connector having a housing configured to accommodate various different configurations of inserts that are configured to hold different types of either fiber optic connector, electrical connectors, or a combination of fiber optic and electrical connectors.

27 Claims, 29 Drawing Sheets

(56) References Cited

U.S. PATENT DOCUMENTS

| | | | | |
|---|---|---|---|---|
| 5,574,812 A * | 11/1996 | Beier | .................... | G02B 6/3869 385/147 |
| 5,882,044 A * | 3/1999 | Sloane | .................. | F16L 19/005 285/148.19 |
| 6,293,595 B1 * | 9/2001 | Marc | .................... | F16L 19/005 285/86 |
| 6,508,593 B1 * | 1/2003 | Farnsworth | .......... | G02B 6/3825 385/134 |
| 7,213,975 B2 * | 5/2007 | Khemakhem | ........ | G02B 6/3817 385/101 |
| 7,326,073 B2 * | 2/2008 | Hanning | .............. | H01R 13/506 439/344 |
| 7,338,214 B1 * | 3/2008 | Gurreri | ................ | G02B 6/3849 385/53 |
| 7,367,832 B2 * | 5/2008 | Muhs | .................. | G02B 6/3879 439/318 |
| 7,572,063 B2 * | 8/2009 | Mynott | ................ | G02B 6/3817 385/56 |
| 7,794,155 B1 * | 9/2010 | Haley | .................. | G02B 6/3879 385/139 |
| 7,972,067 B2 * | 7/2011 | Haley | .................. | G02B 6/3879 385/139 |
| 8,113,722 B2 * | 2/2012 | Scadden | .............. | G02B 6/3817 385/75 |
| 8,249,410 B2 | 8/2012 | Andrus et al. | | |
| 8,579,644 B2 * | 11/2013 | Cole | .................... | H01R 13/533 439/312 |
| 8,628,252 B2 * | 1/2014 | Matsumoto | .......... | G02B 6/3879 385/56 |
| 8,992,148 B2 * | 3/2015 | Schafer | ................ | H01R 13/622 285/92 |
| 9,684,135 B2 * | 6/2017 | Mori | .................... | G02B 6/3853 |
| 9,755,382 B2 * | 9/2017 | Gniadek | ................. | H01R 24/66 |
| 2004/0062498 A1 * | 4/2004 | Del Grosso | .......... | G02B 6/3851 385/114 |
| 2006/0093277 A1 * | 5/2006 | Mulligan | ............. | G02B 6/3817 385/75 |
| 2006/0246771 A1 * | 11/2006 | Pepe | .................... | G02B 6/3879 439/498 |
| 2006/0263011 A1 * | 11/2006 | Chen | ................... | G02B 6/3817 385/75 |
| 2007/0014522 A1 * | 1/2007 | Yamaguchi | .......... | G02B 6/3817 385/88 |
| 2007/0105432 A1 * | 5/2007 | Muhs | ................... | G02B 6/3879 439/492 |
| 2007/0249218 A1 | 10/2007 | Hanning et al. | | |
| 2008/0050070 A1 | 2/2008 | Gurreri et al. | | |
| 2009/0269019 A1 * | 10/2009 | Andrus | ................ | G02B 6/4452 385/135 |
| 2010/2515322 | 8/2010 | Matsumoto et al. | | |
| 2011/0274437 A1 | 11/2011 | Jones et al. | | |
| 2013/0301994 A1 * | 11/2013 | Motofuji | .................. | G02B 6/36 385/78 |
| 2016/0266326 A1 * | 9/2016 | Gniadek | ................ | H01R 24/66 |
| 2017/0365962 A1 * | 12/2017 | Gniadek | ................ | H01R 24/20 |
| 2018/0031775 A1 * | 2/2018 | Gurreri | ................ | G02B 6/3817 |

OTHER PUBLICATIONS

Extended European Search Report for Application No. 15885755.7, dated Sep. 28, 2018, 7 pages.

* cited by examiner

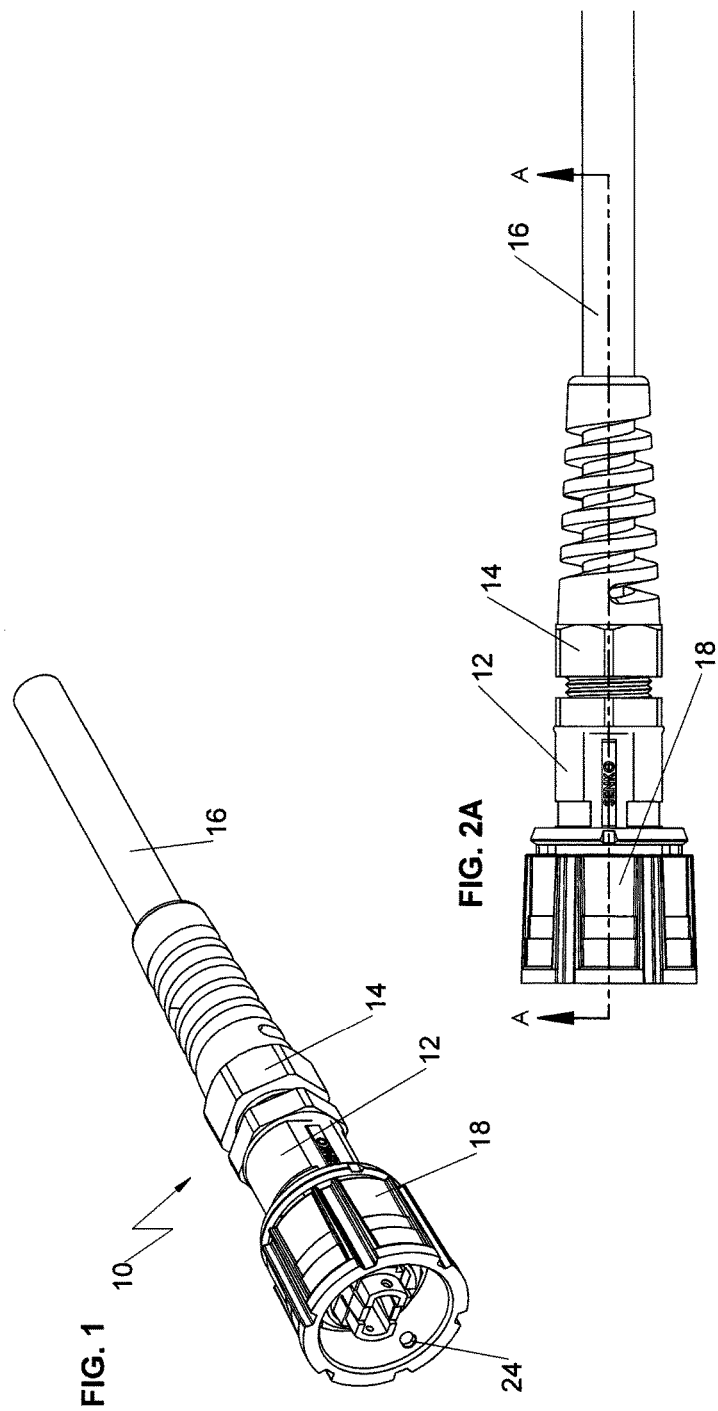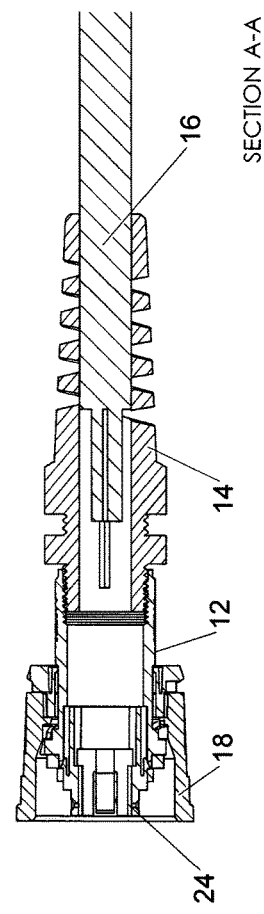

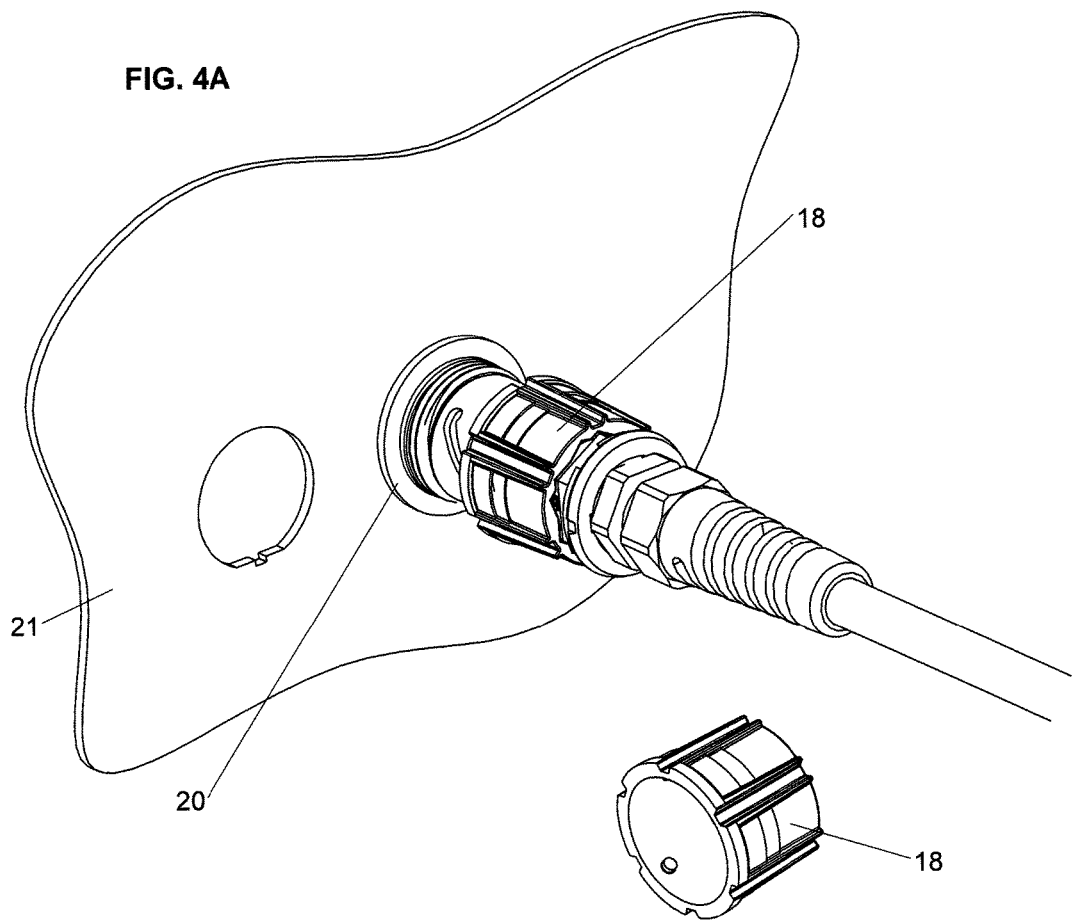

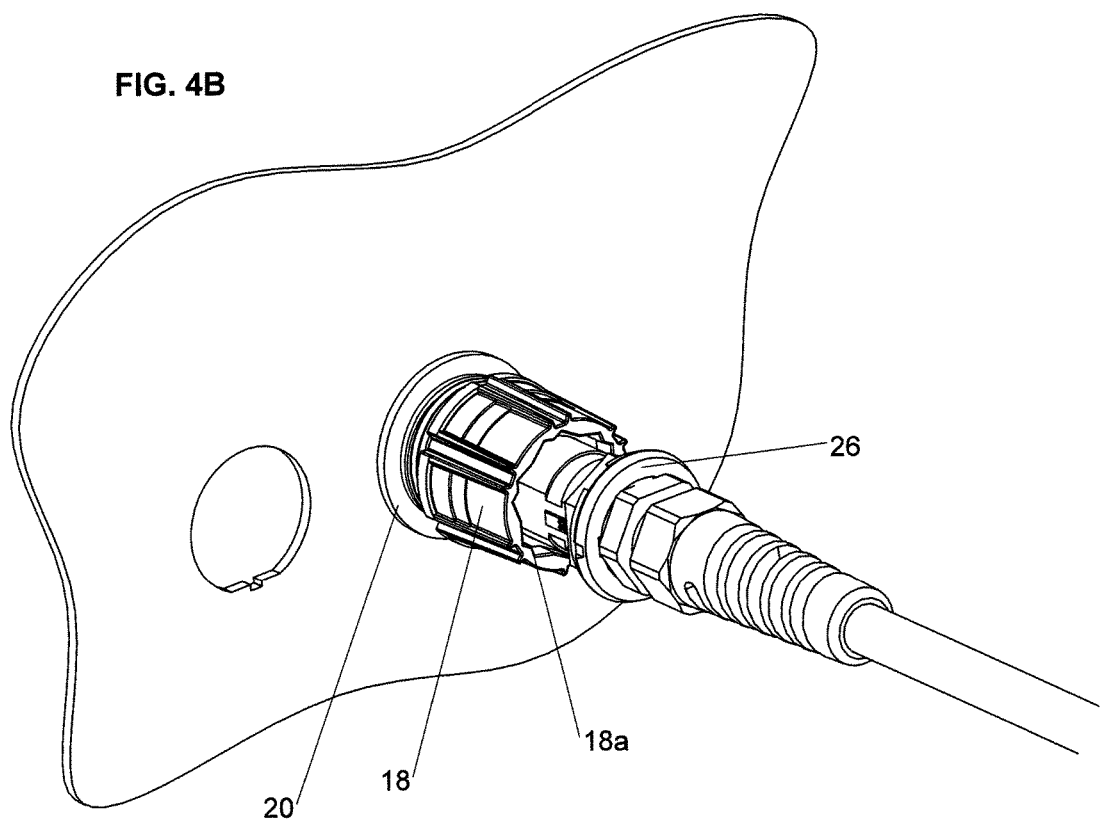

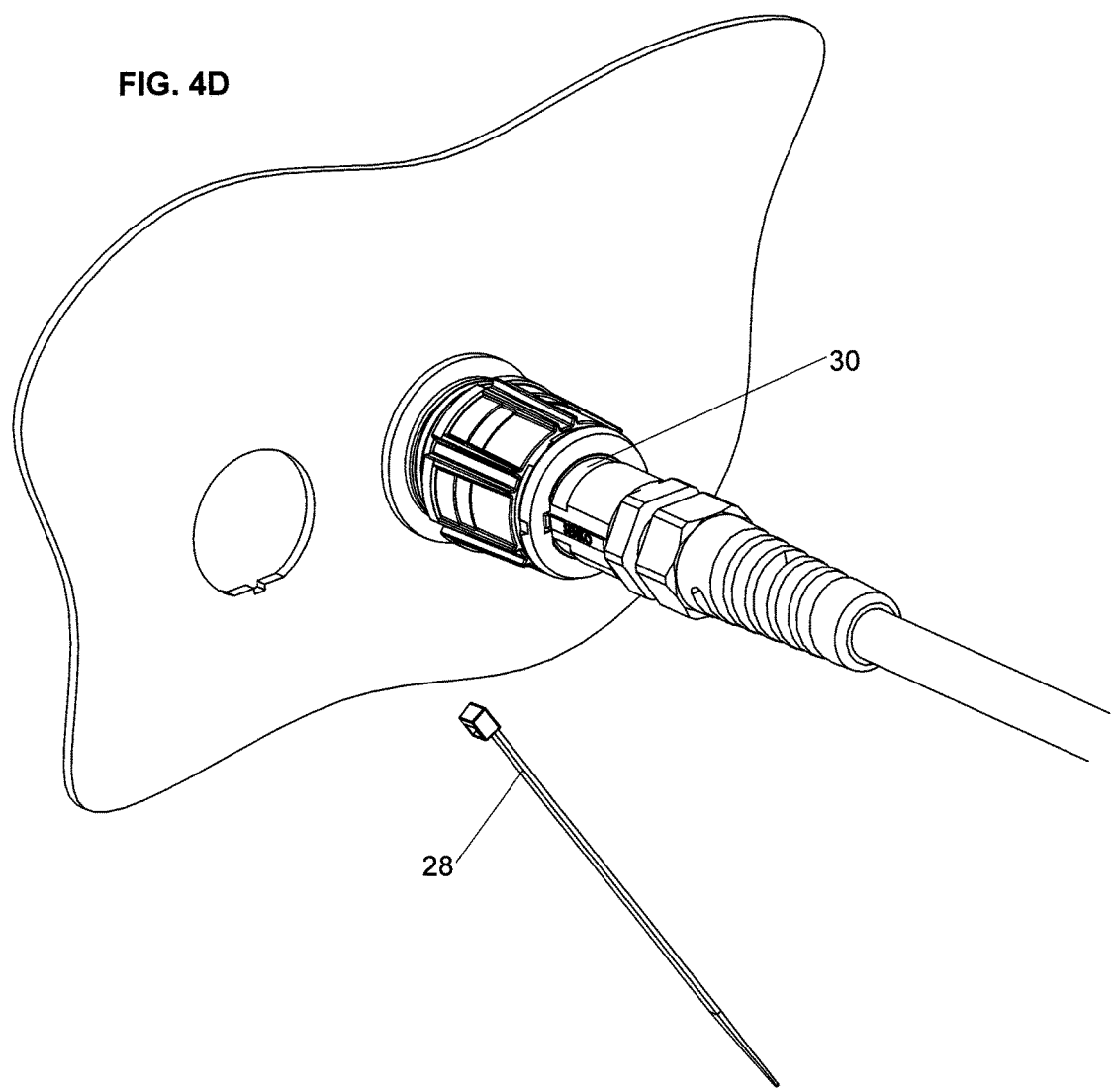

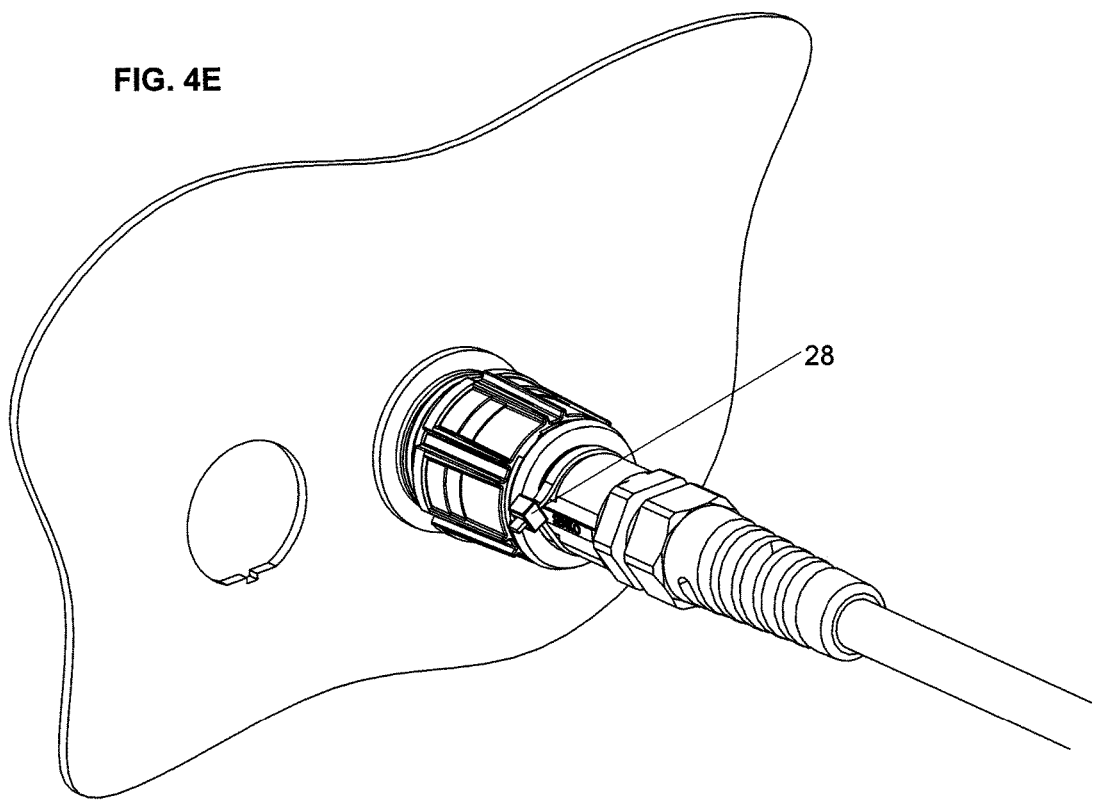

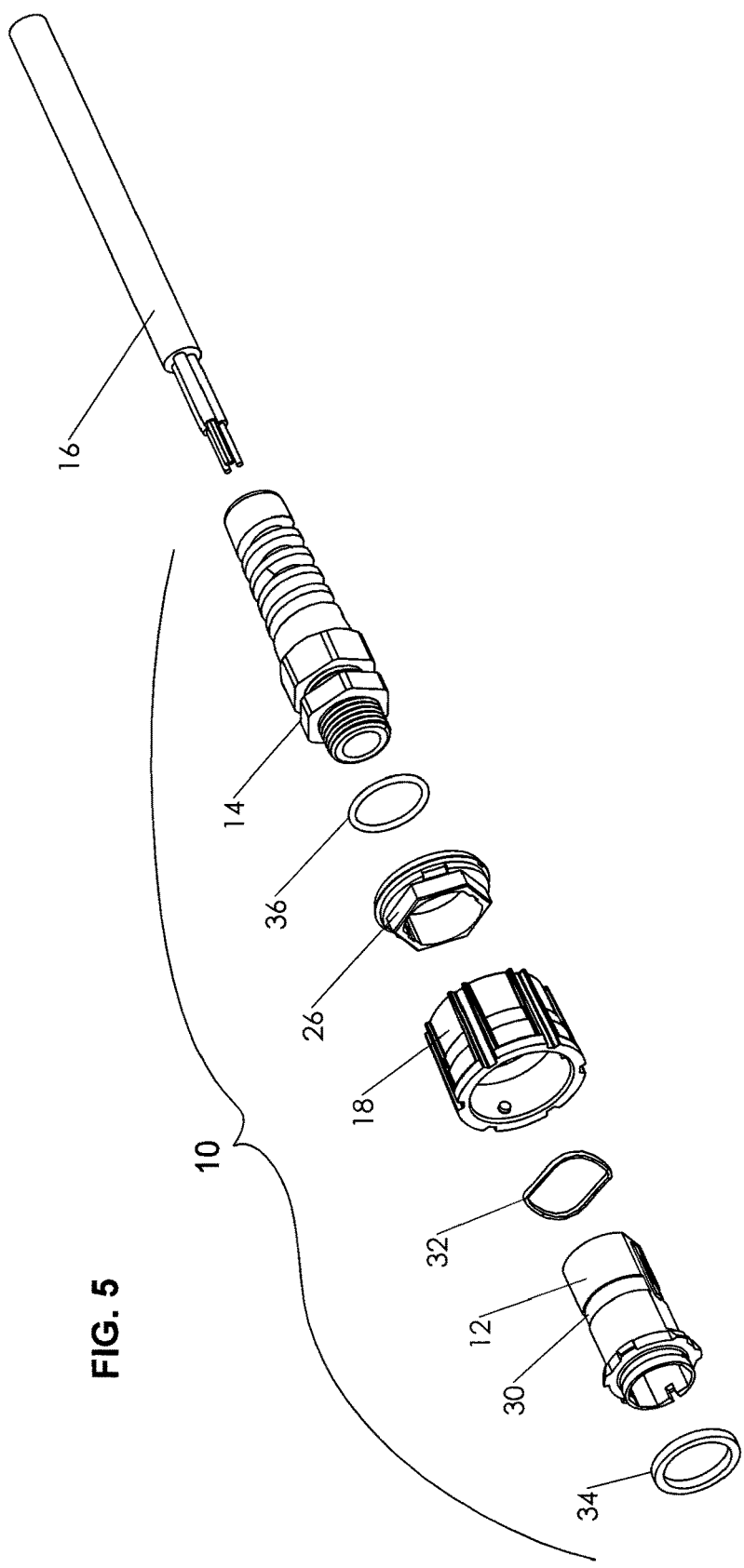

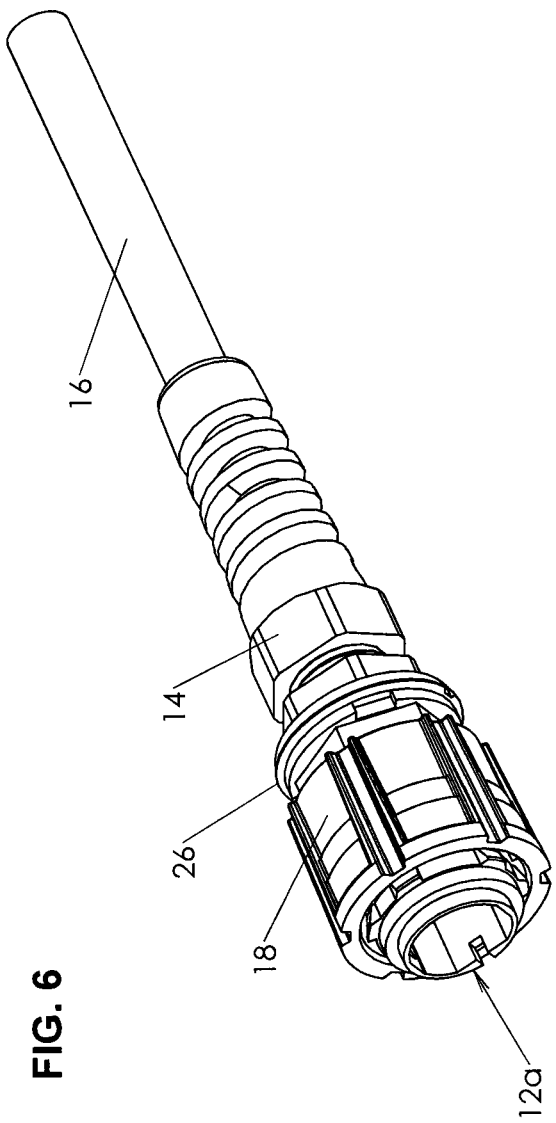

SECTION A-A

SECTION A-A

SECTION A-A

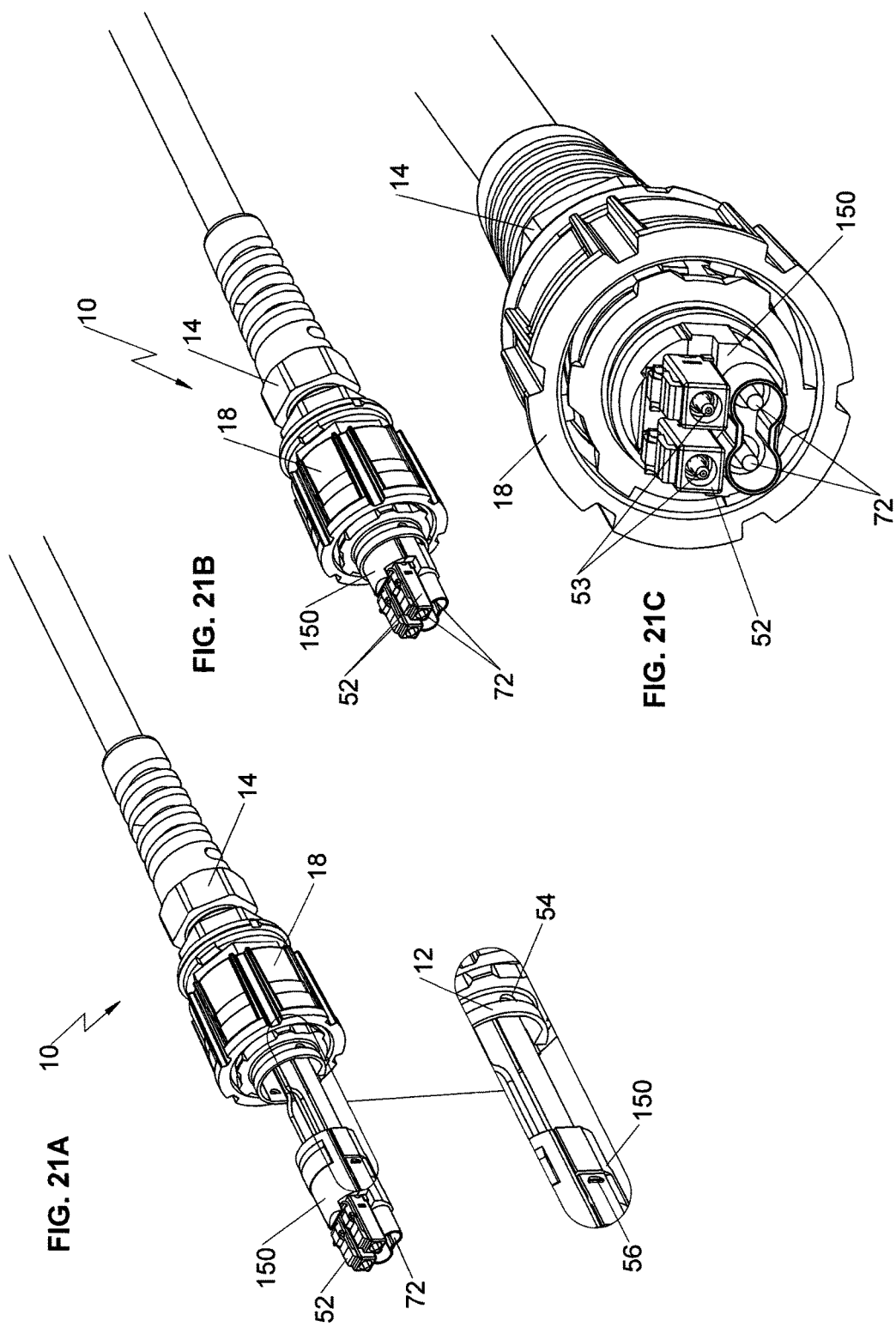

SECTION B-B

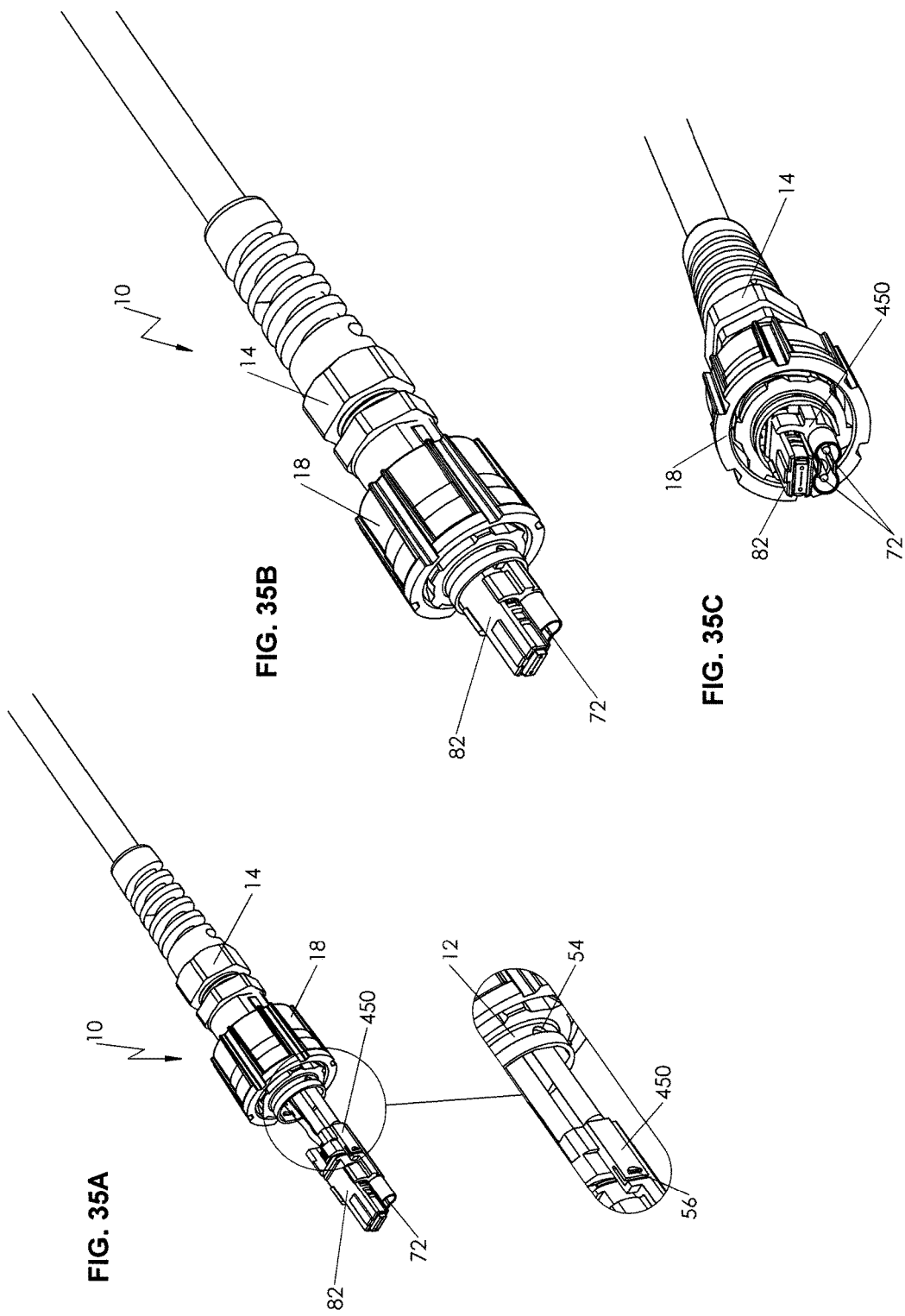

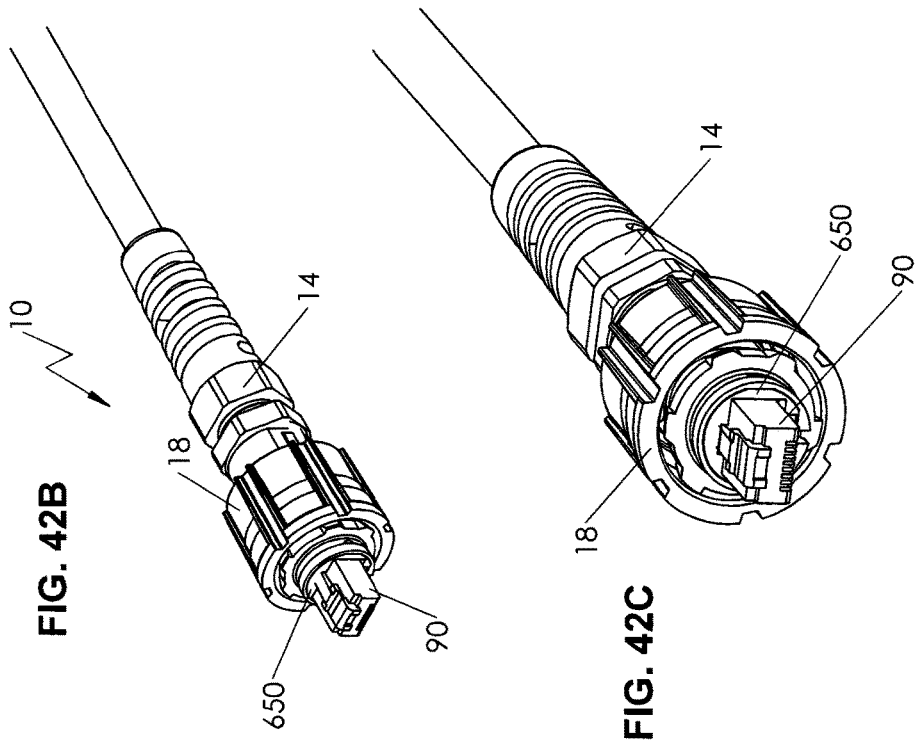
FIG. 42B
FIG. 42C
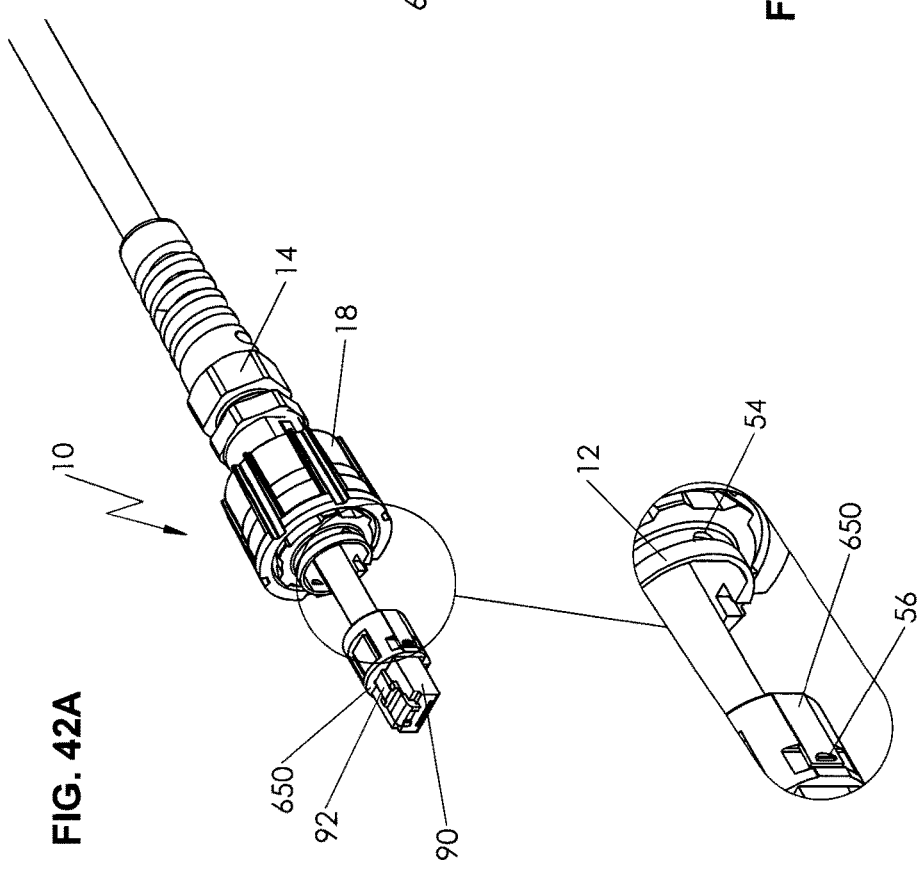
FIG. 42A

CONNECTOR SYSTEM WITH INTERCHANGEABLE CONNECTOR MODULES FOR OPTICAL FIBERS, ELECTRICAL CONDUCTORS, OR BOTH

CROSS REFERENCE TO RELATED APPLICATION

This application is a continuation of U.S. patent application Ser. No. 14/812,232, filed Jul. 29, 2015, and claims the benefit of U.S. Provisional Application No. 62/133,085 filed on Mar. 13, 2015, the contents of which are incorporated by reference in their entirety as if fully set forth herein.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds. Many installations, such as transmission towers or relay sites, however require electrical connections as well to power receivers and transmitters, for example. Signal towers may often be located at ie note distances from telecommunication switching equipment and power connections, requiring that both signal conductors and power conductors be run between the signal tower and switching equipment.

Fiber optic connectors are provided for connecting optical fibers for transmitting light signals for data transmission, while electrical connectors are provided for connecting electrical conductors to power any electrically operated equipment. While data transmission may still be done with electrical conductors, with an increase in the number of broadband wireless installations, more fiber optic cables have been installed for transmitting data signals between signal towers and switching equipment. Electrical data conducting lines are typically run separately from power lines to minimizeEMF interference and shielding constraints. Optical fibers of such systems have also typically been instal led separately from electric power conductors, such that separate fiber optic connectors and electric power connectors were provided for connecting optical fibers and for connecting electric power conductors, respectively.

Hybrid connectors having both optical fiber and electrical connectors included in a single connector eliminate the need for providing two separate connectors. Electric wires and fiber optic cables may be run together in a single cable, and the ends of the cable may be terminated with a single hybrid connector that is configured to be coupled with an adapter to connect the optical transmission paths of the optical cable to other fiber optic cables or devices, and simultaneously connect the electrical wires to other electrical wires or devices. An adapter generally includes a housing, or portion of a housing, having at least one port which is configured to receive and hold a connector to facilitate the optical and/or electrical connection of one connector to another connector or other device. Adapters may be used to facilitate connections contained within a chassis. The term "chassis" as used herein broadly refers to a containment structure for housing electrical components or switching components.

In external applications wherein the adapters and connectors may be exposed to weather, particularly rain or moisture in general, the connectors may be configured as ingress protection (IP) connectors that are waterproof. A standard for such connectors may be an OVDA connector. While each of the various types of optical fiber connectors is different in construction, in order to minimize tooling and manufacturing costs, while also minimizing inventory (the number/variety of parts on hand), there is a need for a connector system having a single adapter and a single connector housing component that is mateable with the adapter, wherein the connector housing is configured to receive any of a plurality of different connector types (fiber optic and/or electrical) therein for mating of the connectors with other connectors.

SUMMARY

A connector system may include an adapter and a connector that is configured to be removably attachable with the adapter. The connector may be configured to receive any of a variety of clip-in attachments that may include different types of fiber optic connectors and/or electrical connectors, thereby providing a modular system. In various embodiments, the clip-in attachments may include, but are not limited to: only fiber optic connectors, such as, but not limited to, LC, SC, MPO connectors; only electrical connectors, such as, but not limited to, RJ45 connectors, electrical socket connectors, or electrical pin-type connectors; or hybrid connectors that include any of the listed fiber optic connectors and electrical pin-type connectors together in a single clip-in attachment.

According to one aspect, there is provided a connector system comprising a housing and an insert removably coupled to the housing, and wherein the insert is removably coupled to a plurality of connectors including at least one of an optical fiber connector and an electrical connector. In some embodiments, the insert may be a clip. The insert may include a catch configured to engage a catch opening of the housing so as to couple the insert to the housing. The catch may be a wedge shaped catch. In some embodiments, an interior surface of the housing may be keyed to match a corresponding surface of the insert so as to allow coupling of the insert to the housing in a single orientation.

In some embodiments, the insert may include a plurality of channels configured to receive the plurality of connectors. Each of the plurality of channels may include a respective catch configured to engage a recess in a sidewall of a respective one of the plurality of connectors. In some embodiments, the insert may include a respective tab configured to engage an arm of a respective one of the plurality of connectors. In various embodiments, the plurality of connectors may be a plurality of LC connectors or a plurality of SC connectors. In sonic embodiments, the insert may include a plurality of bracket arms configured to hold at least one optical fiber connector. In some embodiments, at least one optical fiber connector may be an MPO connector.

According to sonic embodiments, the insert may be a hybrid clip and the plurality of connectors may include at least one optical fiber connector and at least one electrical connector. At least one optical fiber connector may be an LC connector, an SC connector, or an MPO connector. At least one electrical connector may be a pin contact, an electrical socket or an RJ45 connector. The hybrid clip may include a protective sheath disposed around one or more electrical connectors. The hybrid clip may be configured so as to hold at least one optical fiber connector and at least one electrical connector in a stacked arrangement. In some embodiments, the hybrid clip may include a bottom clip portion configured to hold at least one electrical connector, and a top clip portion disposed against the bottom clip portion so as to clamp at least one optical fiber connector therebetween.

In some embodiments, the housing may be configured to removably couple to any one of a plurality of different types of inserts. The plurality of different types of inserts may include a first insert and a second insert. The first insert may be a hybrid insert coupled to both an optical fiber connector and an electrical connector. The second insert may be coupled only to at least one optical fiber connector. The plurality of different types of inserts may further include a third insert coupled only to at least one electrical connector. In various embodiments, the housing may be configured to accommodate any number of different types of inserts.

According to some embodiments, the connector system may further comprise a coupling nut disposed around the housing. The connector system may comprise an adapter coupled to the housing by the coupling nut. The connector system may further comprise a coupling nut lock ring. In various embodiments, the housing may comprise a front portion and a rear portion. The rear portion of the housing may be threaded for receiving a cable strain relief member.

Various embodiments of connector systems disclosed herein may be ingress protected connector systems. Such systems may further comprise at least one weather proofing seal.

According to some embodiments, a connector system may comprise a housing, an insert removably coupled to the housing, and at least one connector removably coupled to the insert, the at least one connector including at least one of an optical fiber connector and an electrical connector. A connector may be an LC connector, an SC connector, an MPO connector, an electrical pin, an electrical socket, or an RJ45 connector.

According to another aspect, a connector system may comprise a housing configured to couple to any one of a plurality of different clips, and at least one clip configured to removably couple to the housing. Each one of the clips may include at least one connector configured to removably couple to that clip, and the connectors may be optical fiber connectors and/or electrical connectors. In various embodiments, a connector may be an LC connector, an SC connector, an MPO connector, an electrical pin, an electrical socket, or an RJ45 connector.

Various features disclosed in conjunction with some embodiments may apply to other embodiments.

BRIEF DESCRIPTION OF THE FIGURES

FIG. 1 is a perspective view of an ingress protection (IP) fiber optic connector according to an embodiment.

FIGS. 2A and 2B depict side and cross-sectional views of the IP connector of FIG. 1 according to an embodiment.

FIGS. 4A-4E are a representative connection sequence for connection of a connector with an adapter according to the embodiment of FIGS. 2A and 2B.

FIG. 5 is an exploded view of a connector according to an embodiment.

FIG. 6 is a perspective view of a connector according to an embodiment.

FIGS. 21A-21C are assembly views of a hybrid LC/electric clip IP connector according to an embodiment.

FIGS. 35A-35C are assembly views of a hybrid MPO/electric clip IP connector according to an embodiment.

FIGS. 42A-42C are assembly views of an RJ45 clip IP connector according to an embodiment.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors and/or electrical connectors therein to align and connect optical fibers end-to-end, or allow for pin/socket electrical connections. For weatherproof or waterproof installations, the connectors may include protective housings and seals to inhibit water penetration. Such connectors may be named IP connectors, or Ingress Protection connectors, and may include different levels of 'ingress protection' depending on the environment to which they will be exposed. While the general discussion herein is directed to IP connecters, the invention is not meant to be limited to such and may also be applied to other types of connectors as well.

Figure 3:
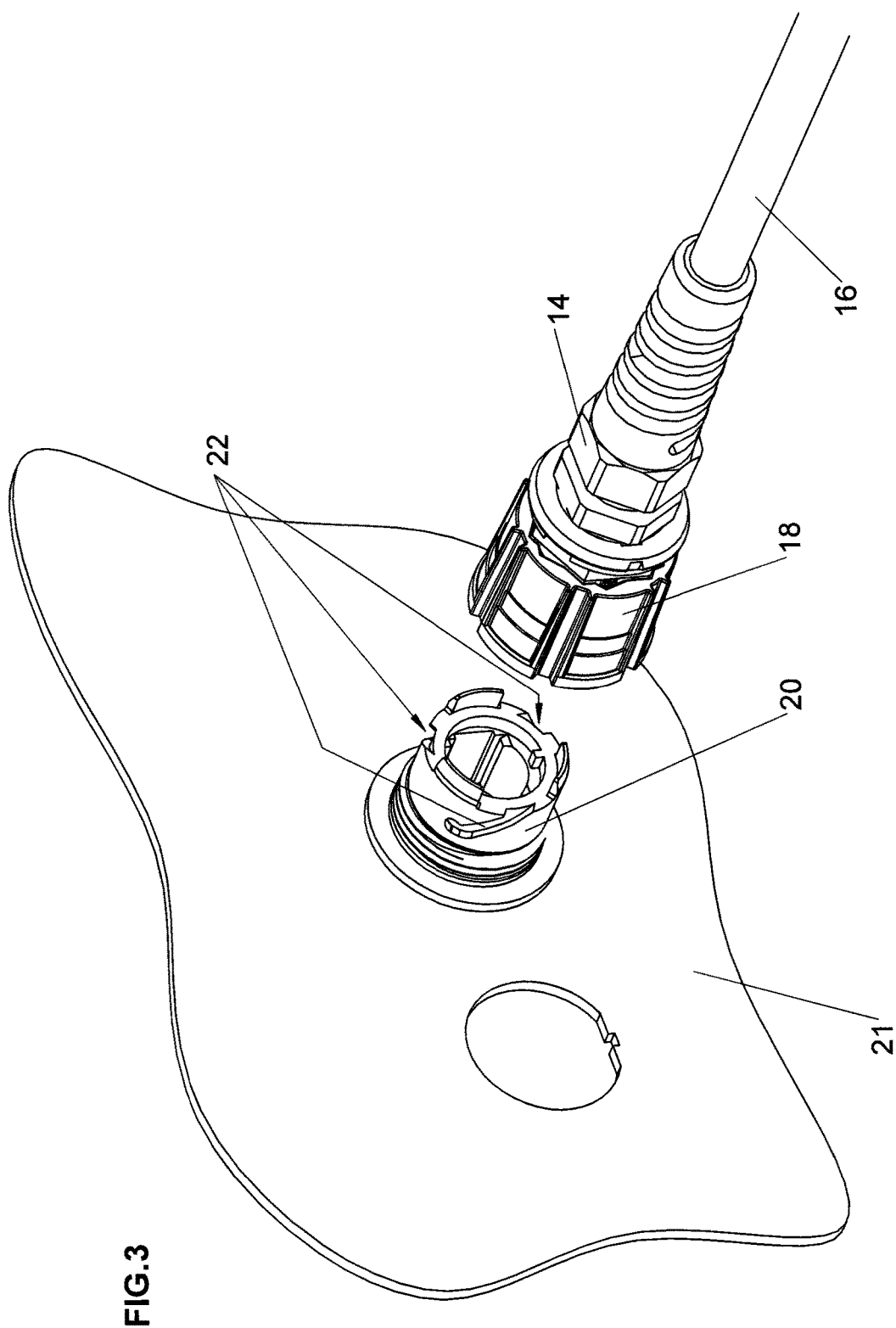
FIG. 3 is a perspective views of an IP connection system with connector and adapter according to an embodiment.

In an embodiment as represented in FIGS. 1, 2A and 2B, a connector 10 for optical fibers and/or electrical wires may include a connector body or housing portion 12 and a cable grip and strain relief portion 14. A cable 16 may terminate within the housing 12 and any optical fibers and/or electrical wires of the cable may themselves be terminated by various types of connectors. A coupling nut 18 may be provided for coupling the connector 10 with an adapter 20 as represented in FIG. 3. As represented in FIG. 3, an adapter 20 may be configured to be fastened to a chassis, bulkhead, or panel 21, or other type of enclosure structure.

In an embodiment, as shown, the coupling nut 18 and adapter 20 may be configured as a bayonet-type coupling wherein the adapter may include grooves 22 for receiving corresponding pins 24 of the coupling nut therein. As depicted, the grooves 22 may be angularly disposed with respect to an axis of the adapter 20 and may terminate with a portion that lies essentially circumferentially and transverse to the longitudinal axis to inhibit release of the coupling nut 18 from the adapter. A resilient member, such as a wave spring 32, shown in FIGS. 5 and 7, may be provided to tension the pins 24 in the transverse segments of the grooves 22. A rotation of the coupling nut 18 on the adapter 20 may interlock and unlock the adapter with the coupling nut. A coupling nut 18 and adapter 20 may be configured with alternative types of coupling mechanisms (not shown) such as, for example, a threaded configuration, or a clip-type attachment.

Figure 4C:
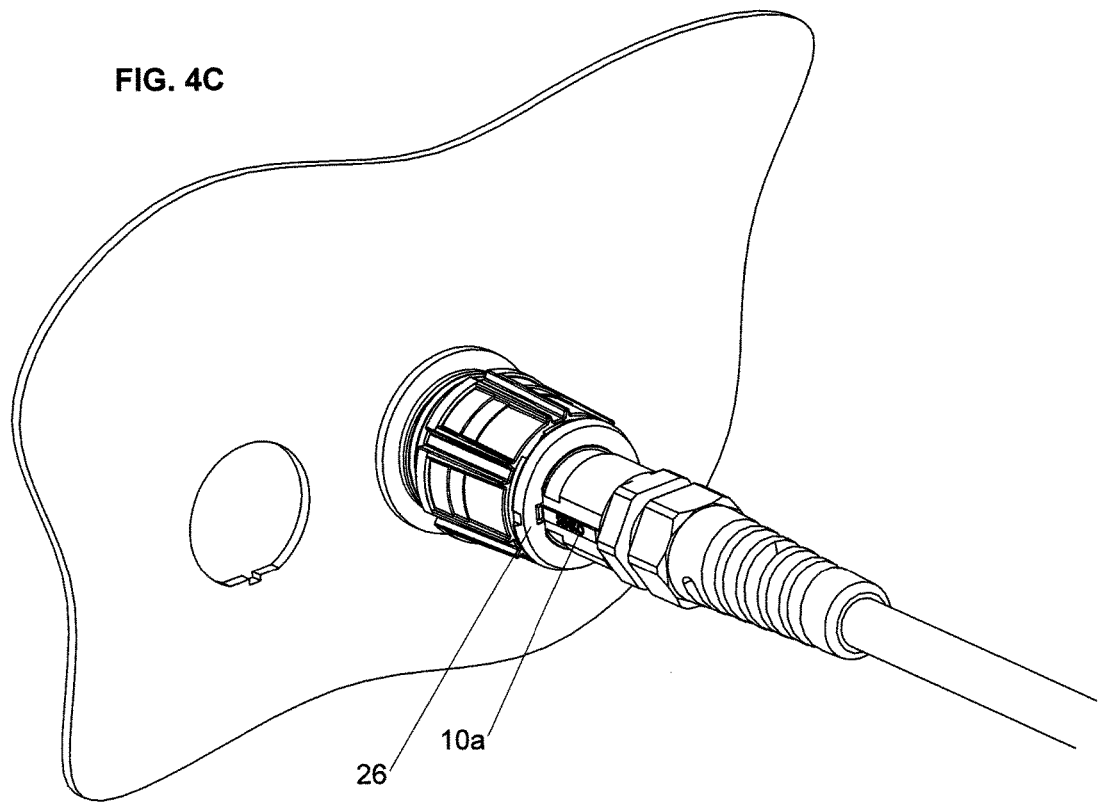

A sequence for connecting and retaining a connector 10 with an adapter 20 is represented in FIGS. 4A-4E. In an embodiment, the connector 10 may be aligned with and inserted into the adapter 20 as shown in FIG. 4A. With the pins 24 aligned with the grooves 22 the nut 18 may be inserted over the adapter and twisted into its locking position as shown in FIG. 4B. The back end 18a of the coupling nut 18 may include an internal configuration such as a hex shape as shown in FIG. 4B. A coupling nut lock ring 26, shown in greater detail in FIG. 5, may be provided on the housing 10. The lock ring 26 may include a portion having a corresponding shape to match the internal configuration of the end 18a of the coupling nut 18. The housing 10 may include at least one flat wall surface 10a and the lock ring 26 may have an internal shape that corresponds to the exterior of the housing 10 so that the flat wall surface inhibits rotation of the lock ring around the housing while allowing longitudinal sliding movement of the lock ring towards and away from the coupling nut 18. With such a housing/lock ring/coupling nut configuration, the coupling nut 18 may be prevented from rotating on the housing 10 when the lock ring 26 is disposed within the coupling nut. Such a configuration may prevent accidental uncoupling of the connector 10 from the adapter 20.

In an embodiment the lock ring 26 may be prevented from moving longitudinally away from coupling nut 18 by a retention device once the lock ring is engaged with the coupling nut. The retention device may be a clip that fits around the housing 10 or clips onto the housing, a ridge or resilient portion of the housing that provides a diameter greater than the internal diameter of the lock ring 26, or, as represented in FIGS. 4D and 4E, a cable tie 28 may be fastened around the housing in a recess or slot 30 of the housing to prevent the lock ring from moving out and away from the adapter 20. To remove the connector 10, the cable tie may be cut, the lock ring 26 may be slid longitudinally away from the coupling nut 18, the coupling nut may be twisted off of the adapter 20, and the connector may be pulled longitudinally away from the adapter.

FIG. 5 provides an exploded view of the connector 10 and the components thereof as previously discussed. Additional weatherproofing seals and O-rings 34, 36 may be provided as needed. The connector 10 may be of a size and configuration sufficient for providing a protective housing assembly for a variety of different types of fiber optic and electrical connectors as discussed herebelow. In embodiments, the connector 10 be configured as an LC, SC, or MPO fiber optic fiber connecter, pin or socket electrical connecter, and RJ45 electrical connector, or a hybrid connector for various combinations of the above, such as LC/electrical pin; LC/electrical socket; SC/electrical pin; SC/electrical socket; MPO/electrical pin; and MPO/electrical socket. Alternatively other types of fiber optic and electric connectors having a size that allows them to fit within the connector 10 may also be used.

Figure 7:
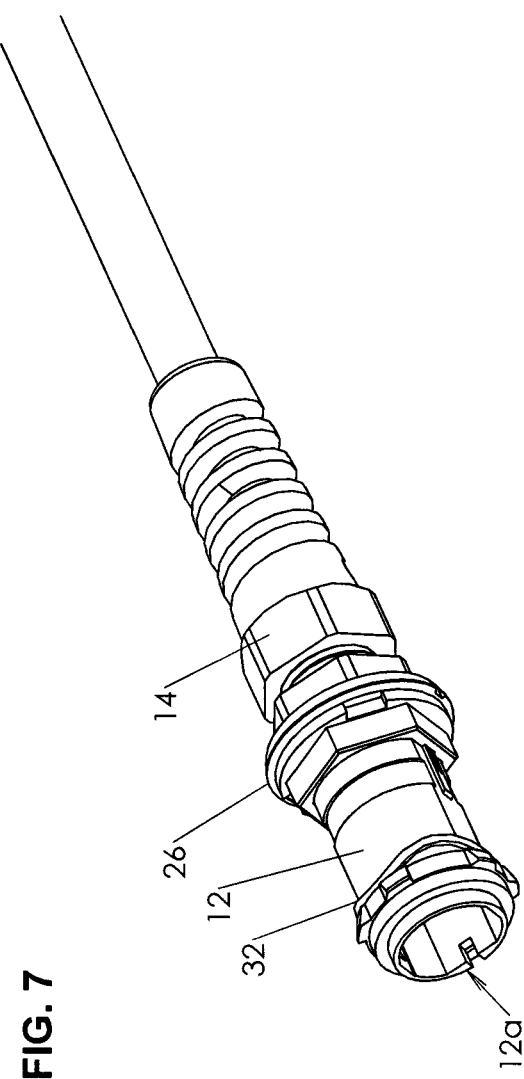
FIG. 7 is a perspective view showing a housing of a connector according to an embodiment.
Figure 8A:
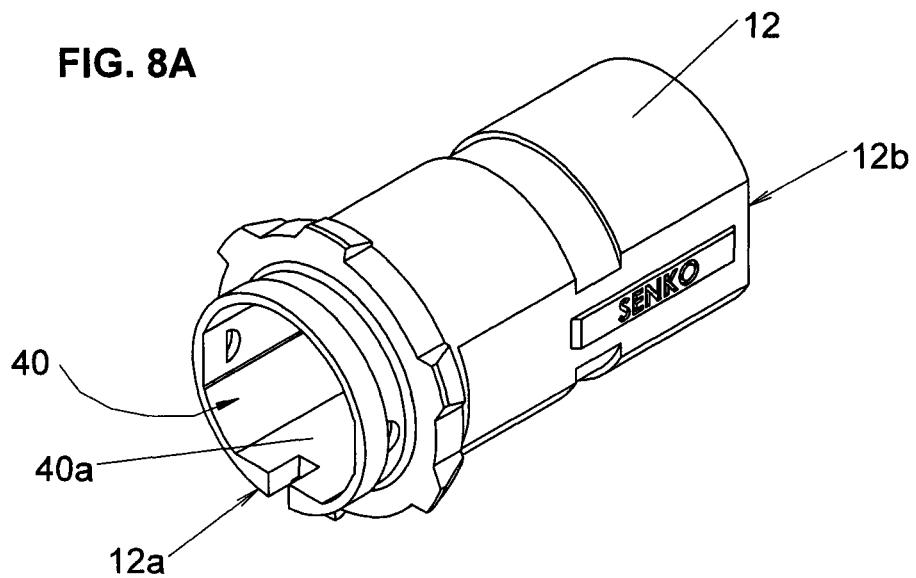
FIGS. 8A and 8B are perspective views of the front and rear ends of a housing of a connector according to an embodiment.
Figure 8B:
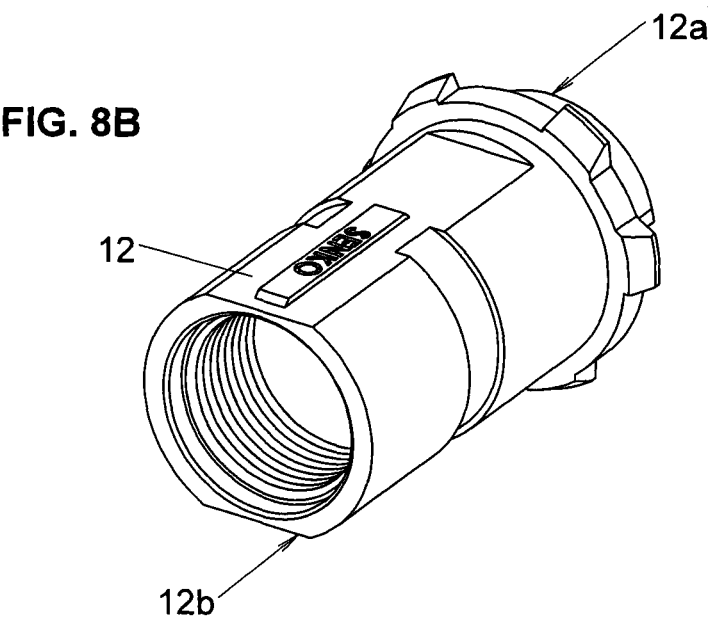

As represented in FIG. 6, the front end 12a of the housing 12 may be configured to receive attachment clips that are configured for accommodating various types of the connectors as mentioned above. FIG. 7 shows the connector 10 with the coupling nut 18 removed, and FIGS. 8A and 8B show an embodiment of the housing 12 alone and in greater detail. The interior surface 40 of the housing 12, at least adjacent the front end 12a, may be non-cylindrical, or keyed to provide only one orientation for insertion of the attachment clips for the connectors. For example, one or more portions 40a of the interior surface 40 may be flat to correspond to a flat surface of an attachment clip. The opposite, or rear end 12b may be threaded for receiving the cable grip and strain relief element 14.

Figure 9:
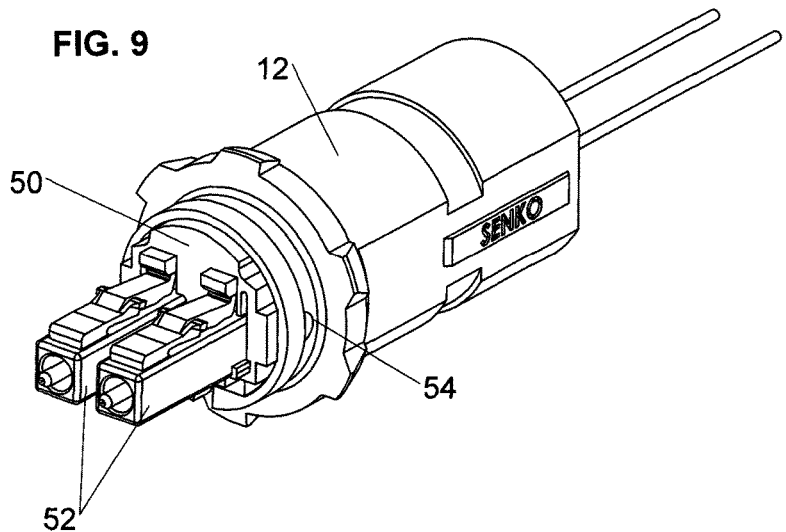
FIG. 9 is a perspective view of a housing with a clip insert and LC connectors according to an embodiment.
Figure 10A:
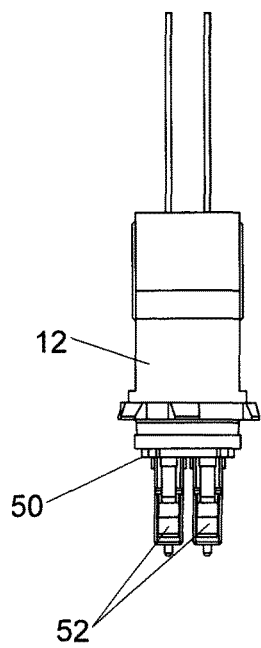
FIGS. 10A-10C are top, side and cross-sectional views of the LC connector configuration of FIG. 9.
Figure 10B:
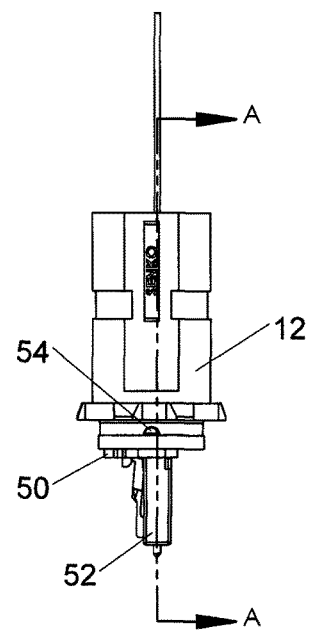
Figure 10C:
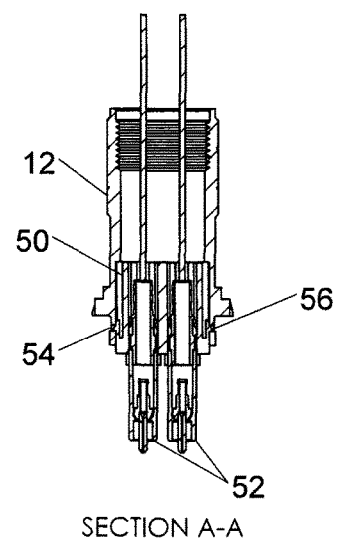
Figure 11:
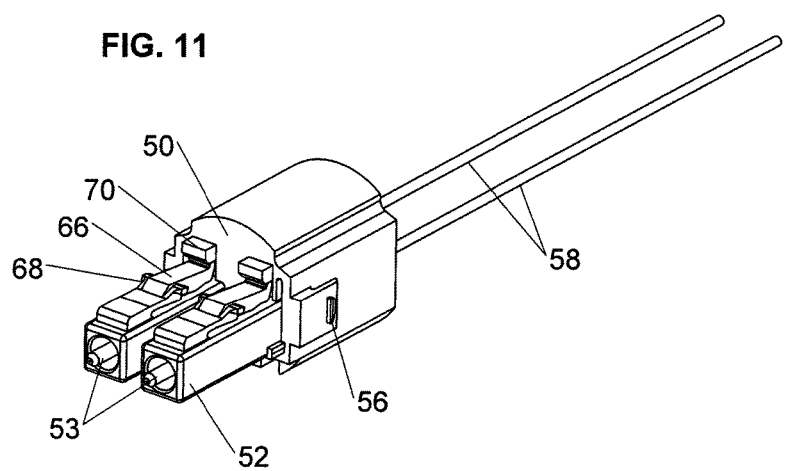
FIG. 11 is a perspective view of a clip insert with LC connectors according to an embodiment.
Figure 12A:
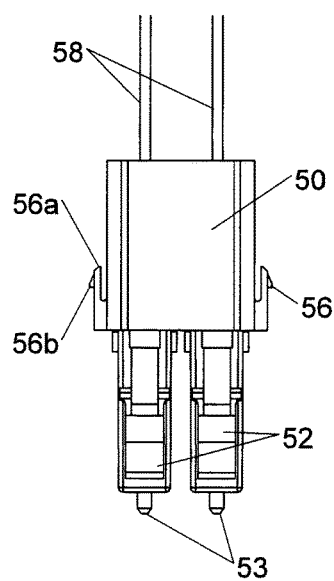
FIGS. 12A-12C are top, side and cross-sectional views of the LC clip insert of FIG. 9.
Figure 12B:
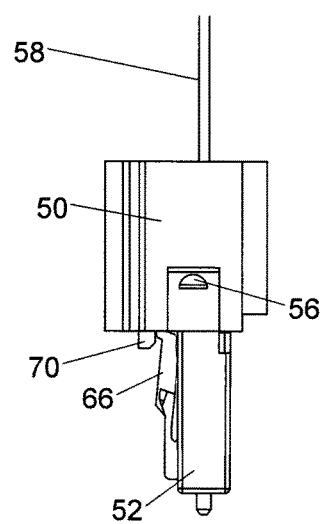
Figure 12C:
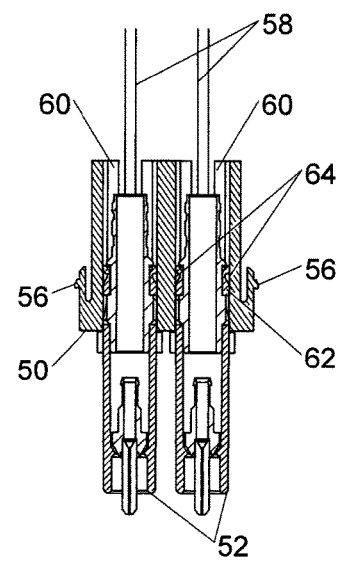

As depicted in FIGS. 9 and 10A-10C, a clip 50 configured to accommodate two fiber optic LC connectors 52 (shown in greater detail in FIG. 11), may fit within the front end 12a of the housing 12. As shown in FIGS. 9 and 10C, the housing 12 may include at least one catch opening 54 configured to engage with a catch 56 of the clip 50 to retain the clip within the housing. In an embodiment as shown, each side of the housing may include an opening 54 and each side of the clip 50 may include a catch 56. Alternatively any number of catches and openings may be provided. As shown in FIGS. 12A and 12C, the catches 56 may be wedge shaped having a pointed leading edge 56a and thickening towards a catch edge 56b. Upon insertion of a clip 50 into the housing 12 the wedge shaped design deflects the catches 56 inwardly, allowing the clip to be inserted in the housing. When the clips 50 move into the catch openings 54 the clips may return to their outer position due to a resiliency of the material of the housing 12 and the catch edge 56b may engage with a forward surface of the opening 54 to retain the clip within the housing. The catches 56 may be released from the openings 54 by insertion of a tool through the openings 54 to depress the catches inwardly, at which time the clips 50 may then be withdrawn from the housing 12.

Figure 14:
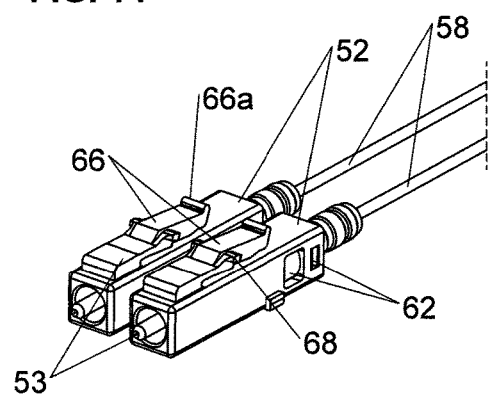
FIG. 14 is a perspective view of LC connectors according to an embodiment.

FIGS. 11 and 12A-12C provide detailed views of an embodiment of a clip 50 with two LC connectors 52. A clip 50 may include channels 60 configured for receiving the LC connectors 52 therein. The LC connectors 52, shown also in FIG. 14, may be connected to optical fibers 58 to provide a terminal connector for the optical fibers at ferrules 53. The LC connectors 52 may include recesses 62 in the sidewalls thereof, and the internal surfaces of the channels 60 may include wedge shaped catches 64 to engage with the recesses to maintain the LC connectors within the channels.

Figure 13A:
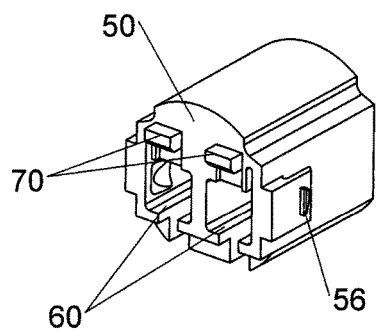
FIGS. 13A-13E are various perspective, top and bottom views of a clip insert for LC connectors according to an embodiment.
Figure 13B:
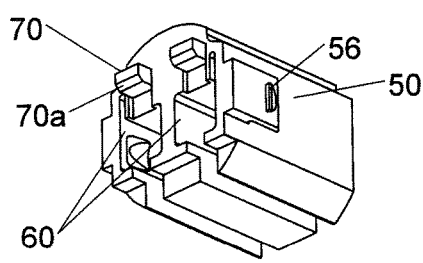
Figure 13D:
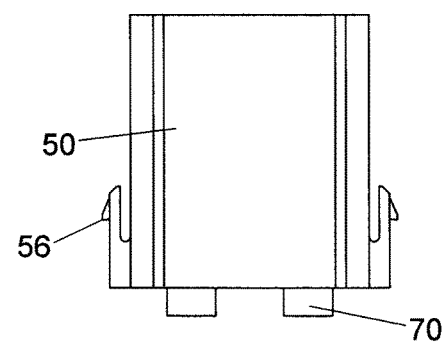
Figure 13C:
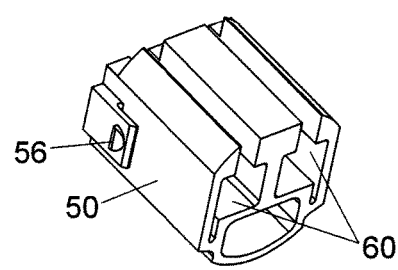
Figure 13E:
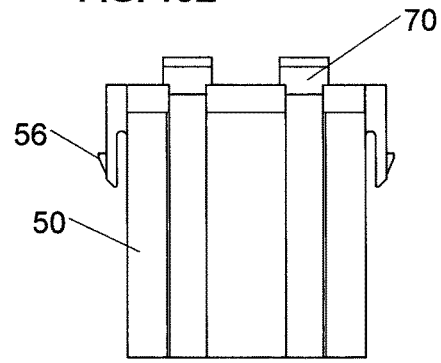

Since LC connectors 52 may include lock/release arms 66 configured with catch member 68, to keep the arms depressed and prevent latching of the catch members in an adapter or other type of connecting device, the clips 50 may include tabs 70 that are configured to align with and depress the arms 66 as the LC connectors are inserted into the clips. A forward edge 70a of a bottom surface of the tabs 70 may be beveled to engage with a leading end 66a of the arms 66 to force the arms downwardly as the leading end passes under the tabs. FIGS. 13A-13E provide detailed views of a clip 50, with FIG. 13A showing a top/front perspective view, FIG. 13B showing a bottom/front perspective view, FIG. 13C showing a bottom/rear perspective view, FIG. 13D showing a top view, and FIG. 13E a bottom view.

Figure 15A:
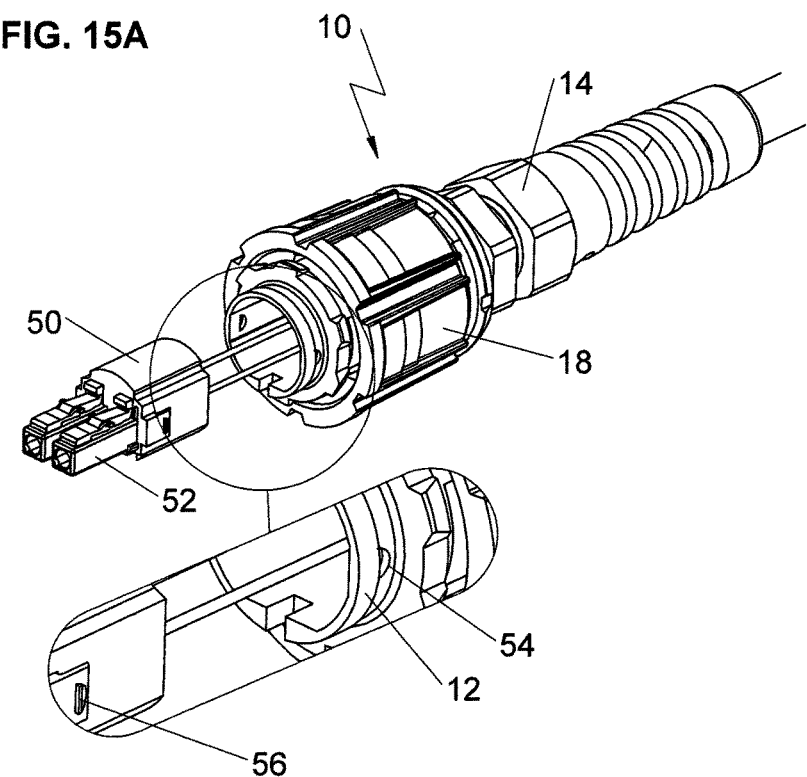
FIGS. 15A-15C are assembly views of an LC clip IP connector according to an embodiment.
Figure 15B:
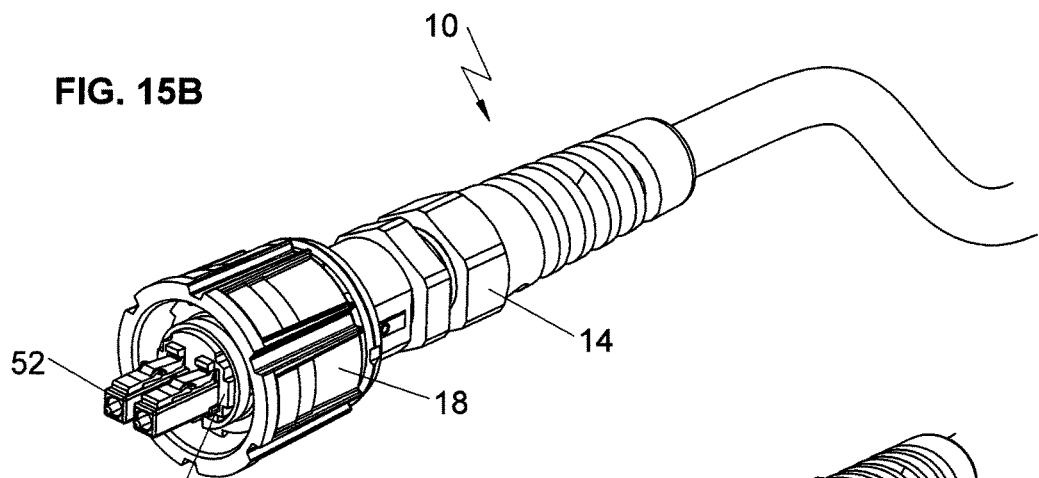
Figure 15C:
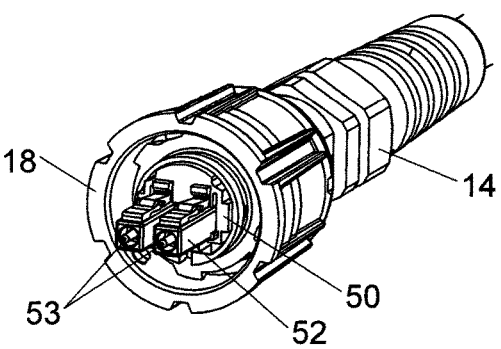

FIGS. 15A and 15B provide assembly views of a connector 10 with a clip 50 having LC connectors 52. FIG. 15A shows a representation of a clip 50 prior to insertion into a housing 12 with a detailed view of the catch 56 and catch openings 54. FIG. 15B provides assembled views of the clip 50 within the housing 12 as components of the connector 10.

Figure 16A:
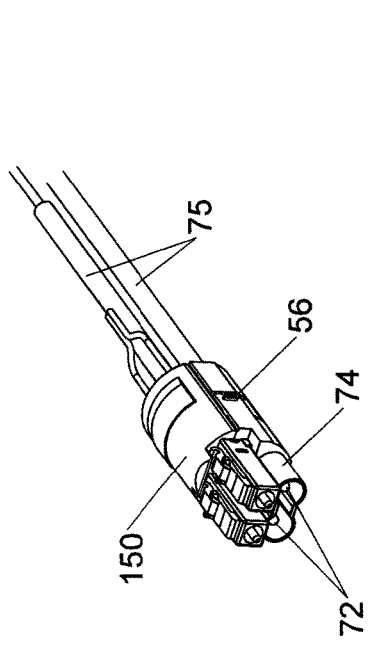
FIGS. 16A and 16B are perspective views of a hybrid clip for LC connectors and electrical contacts in an out of a housing according to an embodiment.
Figure 16B:
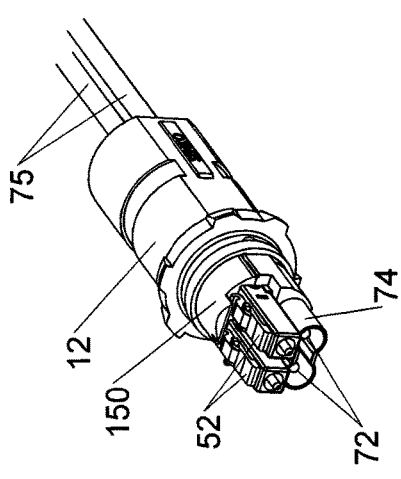
Figure 17:
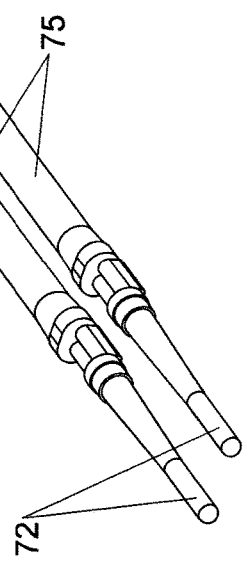
FIG. 17 is a perspective view of a hybrid clip for LC connectors and electric pin contacts according to an embodiment.
Figure 18:
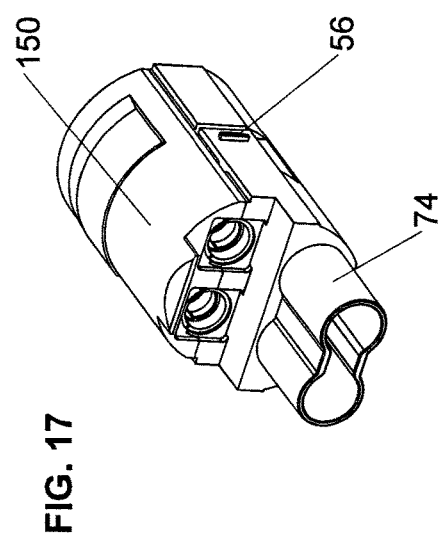
FIG. 18 shows a pair of electrical pin contacts according to an embodiment.

In an alternative embodiment, a hybrid clip 150 may be configured to fit within the front end 12a of the housing 12 as represented in FIG. 16A. The hybrid clip 150, as represented in FIGS. 16B and 17, may include two LC connectors 52, as well as two electrical connectors configured as pin contacts 72. Pins 72 may be any type of electrically conductive material, such as aluminum or copper, for example, and may terminate electrical wires 75 as shown in FIG. 18. The hybrid clip 150 may include a protective sheath 74 extending around the pins 72 to protect the pins as well as provide the user with protection against accidentally touching the pins and receiving an electric shock that may occur if the pins are contacted when an electric current is present in the pins.

Figure 19A:
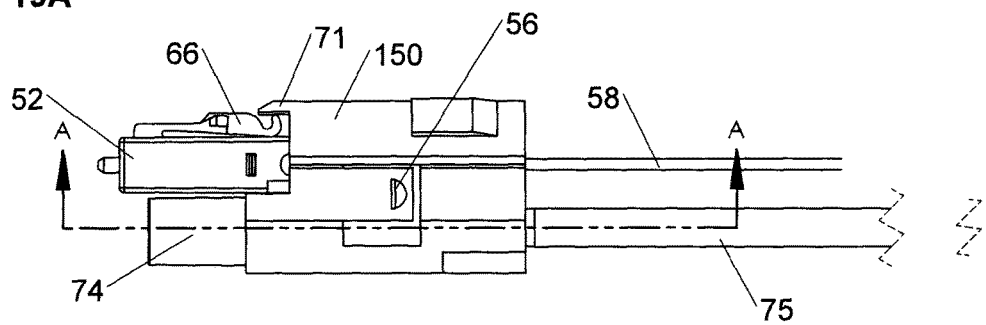
FIGS. 19A and 19B are side and cross-sectional views of the hybrid clip of FIG. 16B.
Figure 19B:
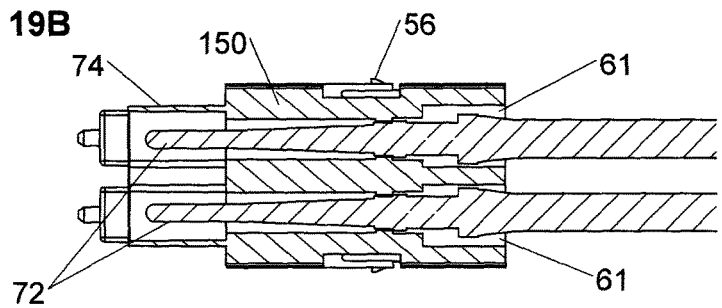

FIG. 19A is a representative side view of a hybrid clip 150 and FIG. 19B is a cross-sectional view through the pins 72 along the line A-A in FIG. 19A. As shown in FIG. 19A, the hybrid clip 150 may include a tab 71 for depressing the arms 66 of the LC connectors 52 in a manner as previously discussed with regard to tabs 70. Hybrid clip 150 may include channels 61 configured for receiving and retaining the pins 72 therein. Pins 72 may be inserted from a rear end of the clip 150 into the channels 61, and the channels may include a portion having a narrow diameter that frictionally engages with a portion of the pins, or the channels and pins may include engagement features such as clips, or complementary notches and recesses that have an engagement that is sufficient to retain the pins in place within clip during connection of a connector 10 with an adapter 20.

Figure 20A:
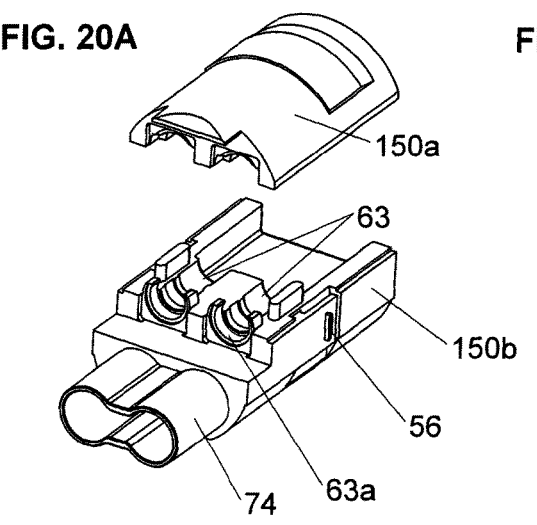
FIGS. 20A and 20B show front and rear perspective views of a two part hybrid clip for LC connectors and electrical contacts according to an embodiment.
Figure 20B:
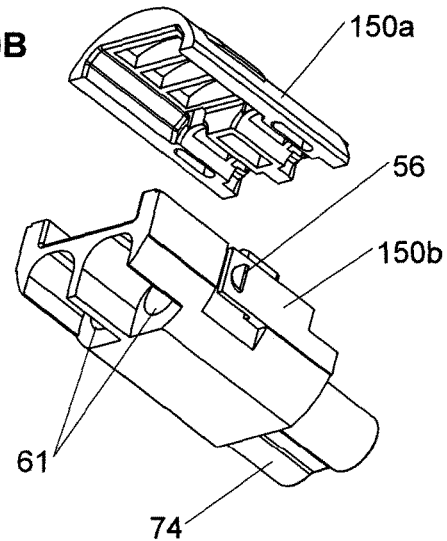

Hybrid clips 150 may also include a similar catch member 56 as previously discussed for retaining the clips within the housing 12. While a clip 150 may be configured as a one-piece clip, the clip may also be a two-piece clip, having a top clip portion 150a and a bottom clip portion 150b as shown in FIGS. 20A and 20B. A two-piece clip may facilitate placement of the LC connectors 52 as the connectors could be laid in place in the channels 63 with a narrowed channel portion 63a engaged with a groove of an LC connector (not shown) to clamp the connectors in place and prevent longitudinal movement of the connectors within the channels when the two portions are joined together.

FIGS. 21A and 21B are similar to FIGS. 15A and 15b with the exception of the change in the clip from the LC clip 50 to hybrid LC/electric pin clip 150, and provide assembly views of a connector 10 with a clip 150 having LC connectors 52 and electrical contacts 72. FIG. 21A shows a representation of a clip 150 prior to insertion into a housing 12 with a detailed view of the catch 56 and catch openings 54. FIG. 21B provides assembled views of the clip 150 within the housing 12 as components of the connector 10.

Figure 22:
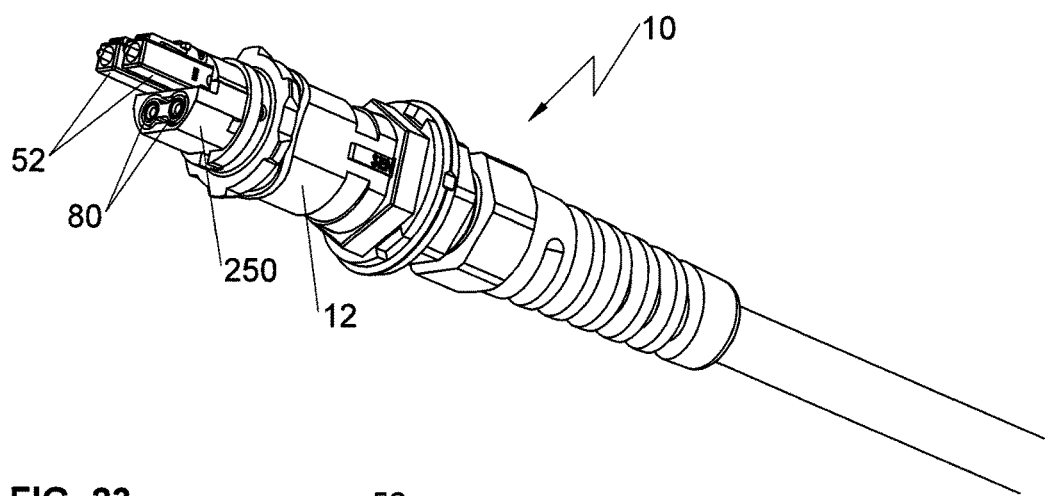
FIG. 22 is a perspective view of a housing and a hybrid clip insert for LC connectors and electrical sockets according to an embodiment.
Figure 23:
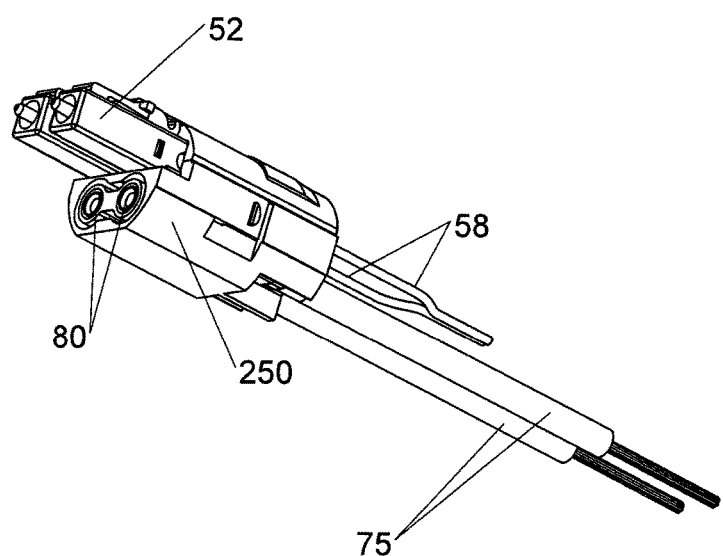
FIG. 23 is a perspective view of a hybrid clip insert for LC connectors and electrical sockets according to an embodiment.
Figure 24:
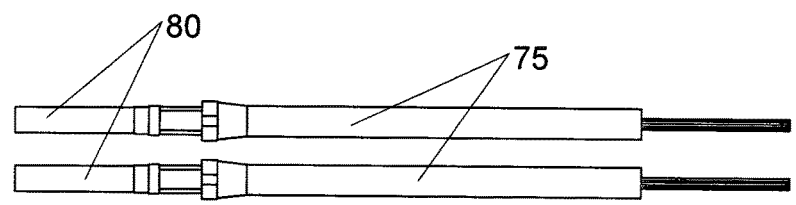
FIG. 24 is a view of a pair of electrical socket connectors according to an embodiment.
Figure 25A:
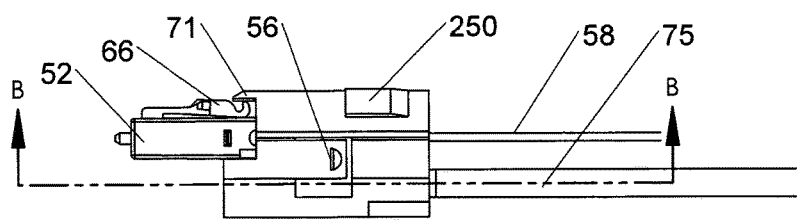
FIGS. 25A and 25B are side and cross-sectional views of the hybrid clip of FIG. 23.
Figure 25B:
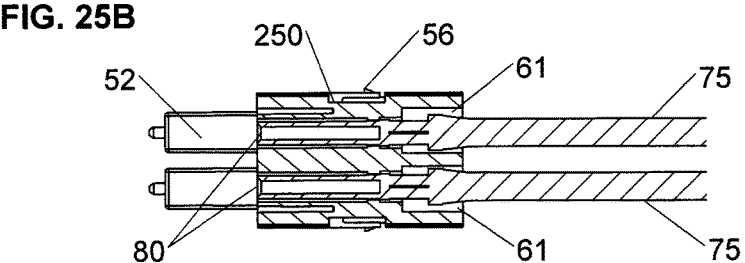

FIGS. 22 and 23 depict an alternative hybrid clip 250 that may be similar to the hybrid clip 150 but instead of electrical pin contacts 72 (male electrical connectors), may include sockets 80 (female electrical connectors) for receiving electrical pins, such as pins 72, therein. Like the pins 72, the sockets 80 may also be made from an electrically conductive material such as copper or aluminum, for example. FIG. 22 shows the hybrid clip 250 installed within the housing 12 of a connector 10. Sockets 80 may be provided at the terminal ends of electrical wires 75 as represented in FIG. 24. The sockets 80 may be retained within the clip 250 in a similar manner as previously described with regard to pins 72, and as depicted in FIG. 25B. FIG. 25B shows a cross-sectional representation of the clip 250 along the line A-A of FIG. 25A.

Figure 26A:
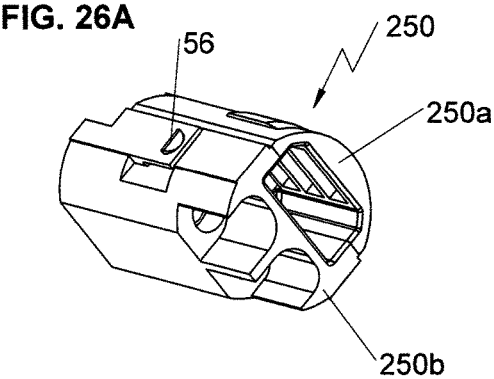
FIGS. 26A and 26B are front and rear perspective views of a hybrid clip insert for LC connectors and electrical sockets according to an embodiment.
Figure 26B:
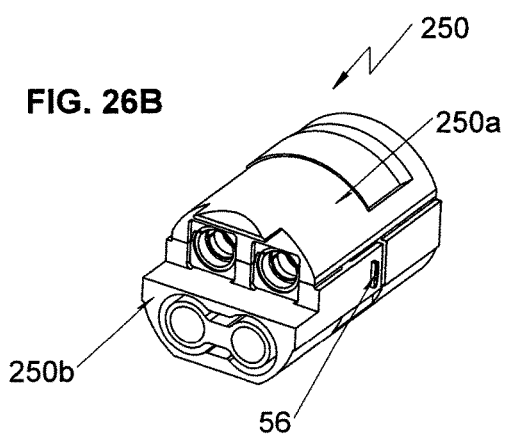

Hybrid clip 250 may be a one-piece clip, or like hybrid clip 250 may be a two-part clip having a top clip portion 250a and a bottom clip portion 250b as shown in FIGS. 26A and 26B. Hybrid clip 250 may be generally similar in many ways with hybrid clip 150 with the exception of the pins 72 being replaced by sockets 80.

While not depicted in the figures, a connector 10 may be configured for only an electrical connection wherein a clip may be configured to accommodate only sheathed pins 72 or sockets 80, or alternatively one pin and one socket for a keyed configuration where one of the wires may provide a positive terminal and the other a negative terminal, such as for DC current. A clip for providing electrical connections only may essentially resemble the bottom half of the clip 150, or the bottom half of the clip 250 and not include the fiber optic portion as shown.

Figure 27:
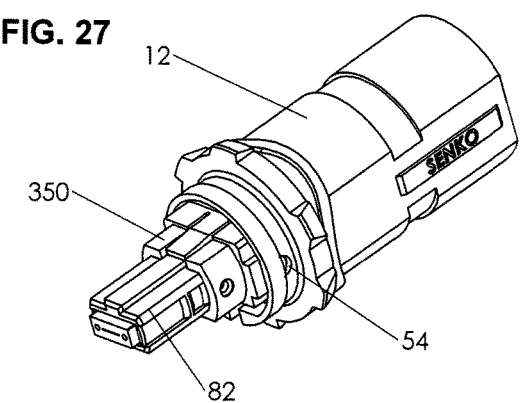
FIG. 27 is a perspective view of a housing and a clip insert with an MPO connector according to an embodiment.
Figure 28:
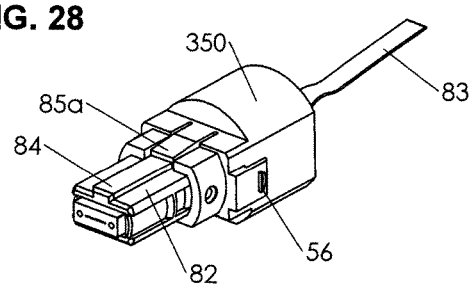
FIG. 28 is a perspective view of a clip insert with an MPO connector according to an embodiment.
Figure 29A:
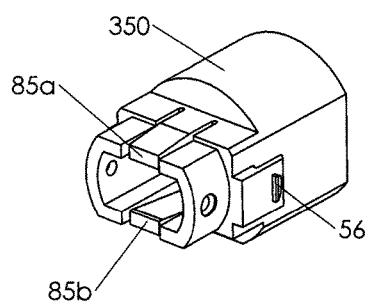
FIGS. 29A and 29B are front and rear perspective views of a clip insert for MPO connectors according to an embodiment.
Figure 29B:
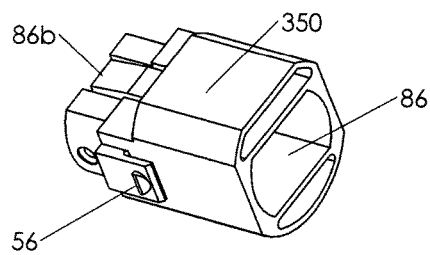
Figure 30:
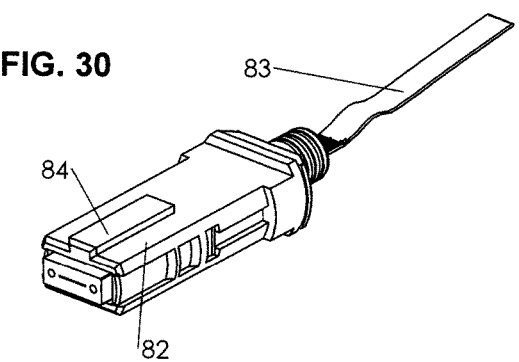
FIG. 30 is a perspective view of an MPO connector according to an embodiment.

In an alternative embodiment, a clip 350, as shown in FIGS. 27 and 28, may be configured to accommodate an MPO connector 82. Clip 350 like the previous embodiments, may include catches 56 for engaging in the openings 54 of the housing 12 and retaining the clip within the housing as previously discussed. FIGS. 29A and 29B show respectively, a top/front perspective view and a bottom/rear perspective view of the clip 350. As shown in FIGS. 28 and 30, the MPO connector 82 may terminate a ribbon cable 83 of optical fibers, and the MPO connector may include a key 84 for determining a polarity of the connector.

As shown in FIG. 28, the key 84 may also provide a means for retaining the MPO connector 82 within the clip 350. Each of the top and bottom of the clip 350 may include a resilient arm 85a or 85b. When the MPO connector 82 is inserted into the channel 86 of clip 350 from the rear side of the clip (FIG. 29B) and through the front as shown in FIG. 28, the key 84 may displace the corresponding arm 85a or 85b adjacent the key outwardly, allowing the connector to pass through the clip and out the front end. Once the raised key 84 passes the leading edge of the corresponding are 85a or 85b, the arm may return to its origin, abutting the back edge of the key 84, restricting the MPO connector 82 from being withdrawn from the clip 350. To remover an MPO connector 82 from a clip 350, the resilient arm 85a or 85b retaining the connector in place may be pried upwardly with a small tool, such as a screwdriver to provide clearance for the key to again pass under the arm and the connector to be moved rearwardly out of the clip.

Figure 31:
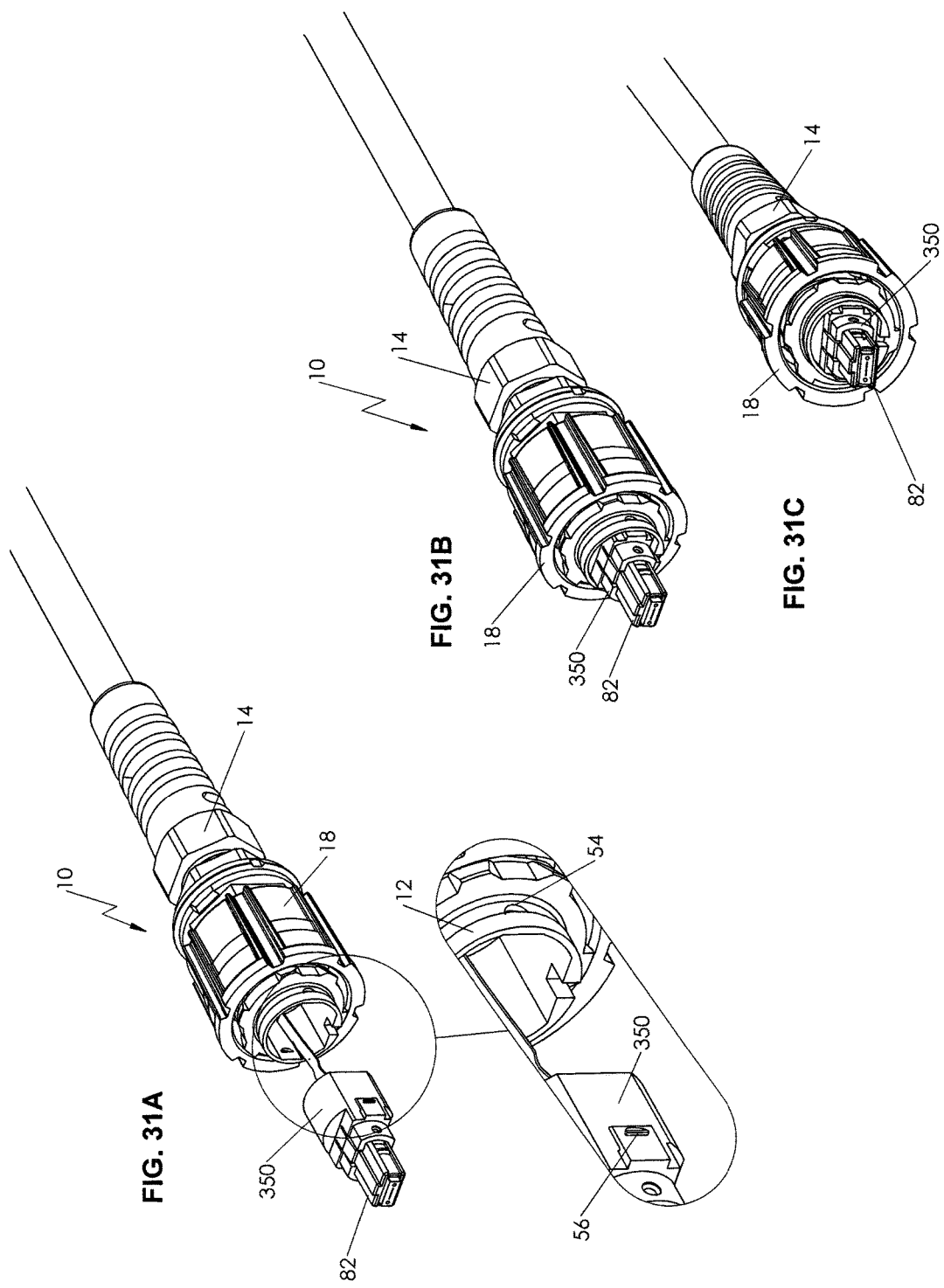
FIGS. 31A-31C are assembly views of an MPO clip IP connector according to an embodiment.

FIGS. 31A and 31B are similar to FIGS. 15A and 15B with the exception of the change in the clip to an MPO clip 350, and provide assembly views of a connector 10 with a clip 350 having an MPO connector 82. FIG. 31A shows a representation of a clip 350 prior to insertion into a housing 12 with a detailed view of the catch 56 and catch openings 54. FIG. 31B provides assembled views of the clip 350 within the housing 12 as components of the connector 10.

Figure 32:
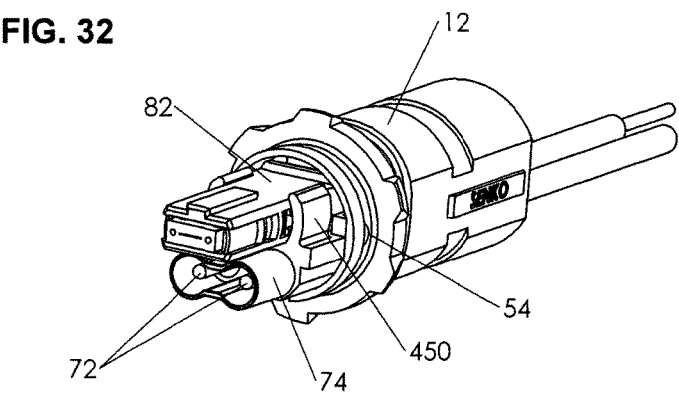
FIG. 32 is a perspective view of a housing and a hybrid clip insert with an MPO connector and electrical pin contacts according to an embodiment.
Figure 33:
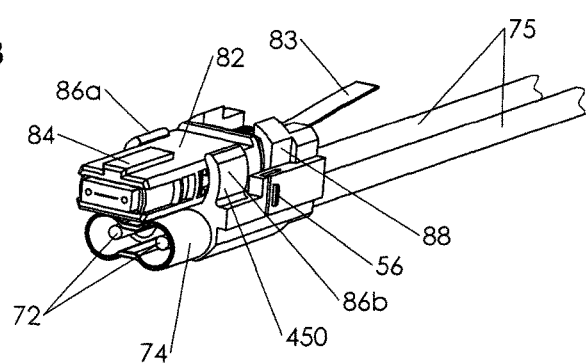
FIG. 33 is a perspective view of a hybrid clip insert with an MPO connector and electrical pin contacts according to an embodiment.

In an alternative embodiment as represented in FIGS. 32, a hybrid MPO/electric clip 450 may be configured to fit within the front end 12a of the housing 12. The hybrid clip 450, as represented in FIG. 33 may include an MPO connectors 82 as well as two electrical connectors configured as pin contacts 72. Pins 72, as previously discussed, may be any type of conductive metal, such as aluminum or copper, and may terminate electrical wires 75 as shown in FIG. 33. The hybrid clip 450 may include a protective sheath 74 extending around the pins 72 to protect the pins as well as provide the user with protection against accidental electric shock that may occur if the pins are contacted.

Figure 34A:
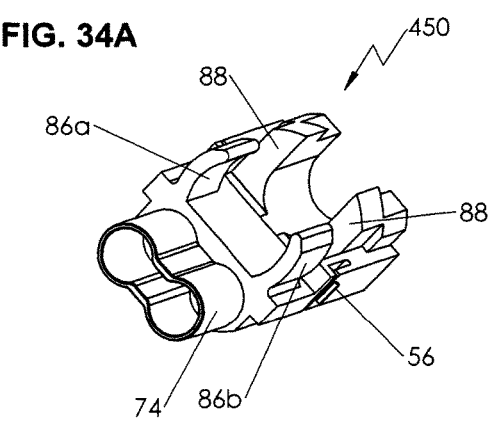
FIGS. 34A and 34B are front and rear perspective views of a hybrid clip insert for an MPO connector and electrical pin contacts according to an embodiment.
Figure 34B:
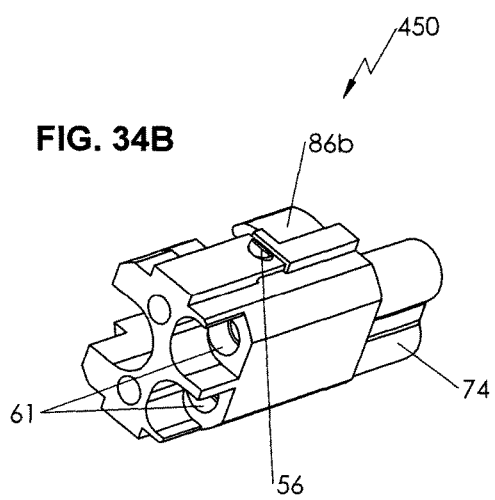

As discussed with respect to FIGS. 19A and 19B, a hybrid clip 450 may include channels 61, shown in FIG. 34B, configured for receiving and retaining the pins 72 therein. Pins 72 may be inserted from a rear end of the clip 450 into the channels 61, and the channels may include a portion having a narrow diameter that frictionally engages with a portion of the pins, or the channels and pins may include engagement features such as clips, or complementary notches and recesses that have an engagement that is sufficient to retain the pins in place within clip during connection of a connector 10 with an adapter 20.

Hybrid clips 450 may also include a similar catch member 56 as previously discussed for retaining the clips within the housing 12. A clip 450 may be configured as a one-piece body as shown in FIGS. 34A and 34B. For retention of the MPO connector 82 in the hybrid clip 450, the clip may have a pair of opposed bracket arms 86a, 86b extending from a body portion of the clip and spaced apart from one another by a distance sufficient to accommodate the body of the connector therein. A top portion of the arms 86a, 86b may be configured to extend around at least a portion of the body of the MPO connector 82 as shown in FIG. 33 to hold the connector in place, and at least minimize movement of the connector away from the clip 450 in a transverse direction to a longitudinal axis of the clip.

The arms 86a, 86b may be displaceable outwardly away from one another to allow for insertion of the connector 82 into the retaining space between the arms. Once the connector 82 is inserted between the arms 86a, 86b, the arms may return to their original position to hold the connector in place. To prevent the MPO connector 82 from moving longitudinally within the clip 450, such as during insertion of a connector 10 into an adapter 20 wherein a rearward pressure may be applied to the MPO connector 82, the clip may include wall portions 88 configured to abut the rear end of the MPO connector to block longitudinal movement of the MPO connector in the rearward direction.

FIGS. 35A and 35B are similar to FIGS. 31A and 31B with the exception of the change in the clip to an MPO/hybrid electric clip 450, and provide assembly views of a connector 10 with a clip 450 having an MPO connector 82 as well as pin contacts 72. FIG. 35A shows a representation of a clip 450 prior to insertion into a housing 12 with a detailed view of the catch 56 and catch openings 54. FIG. 35B provides assembled views of the clip 450 within the housing 12 as components of the connector 10.

Figure 36:
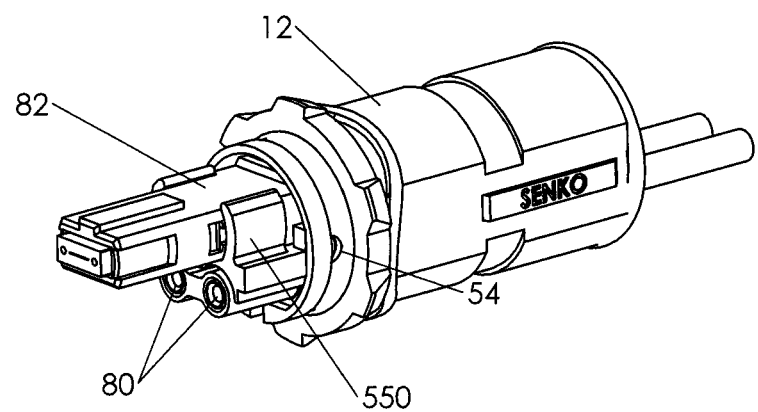
FIG. 36 is a perspective view of a housing and a hybrid clip insert with an MPO connector and electrical socket contacts according to an embodiment.
Figure 37:
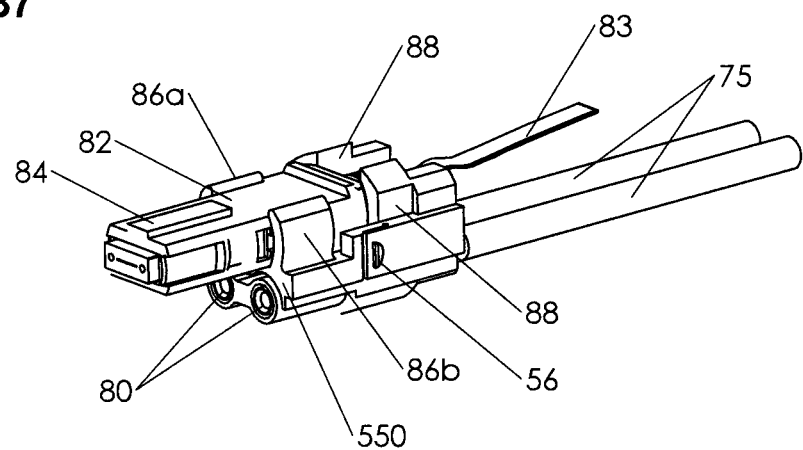
FIG. 37 is a perspective view of a hybrid clip insert with an MPO connector and electrical socket contacts according to an embodiment.

In another embodiment, as represented in FIGS. 36 and 37, a hybrid clip 550, essentially similar to hybrid clip 450, may be configured with electrical sockets 80 instead of pin contacts 72 essentially replacing the bottom electrical portion of the clip 450 with the bottom electrical portion of the clip 250 that includes sockets 80. Other portions of clip 550 may essentially be duplicates of the clip 450.

Figure 38:
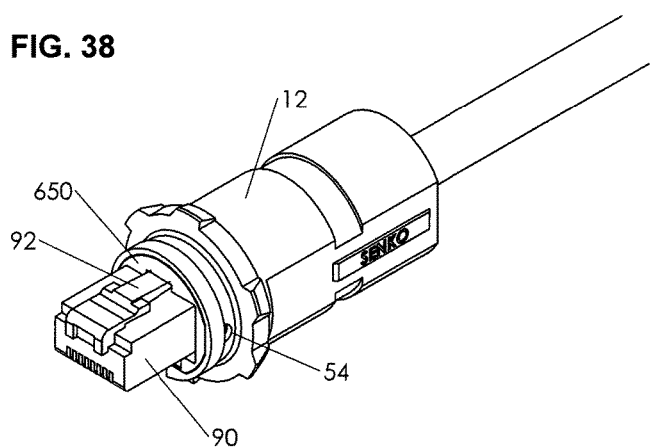
FIG. 38 is a perspective view of a housing and a clip insert with an RJ45 connector according to an embodiment.
Figure 39:
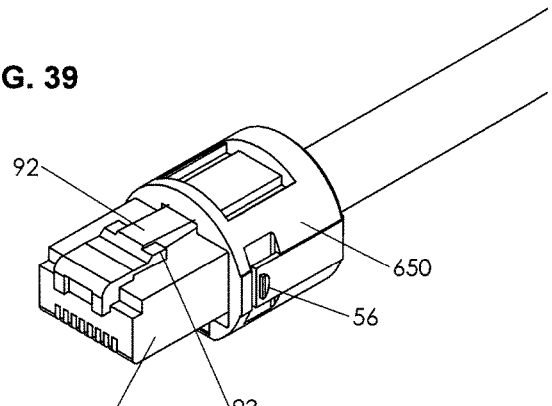
FIG. 39 is a perspective view of a clip insert with an RJ45 connector according to an embodiment.
Figure 41:
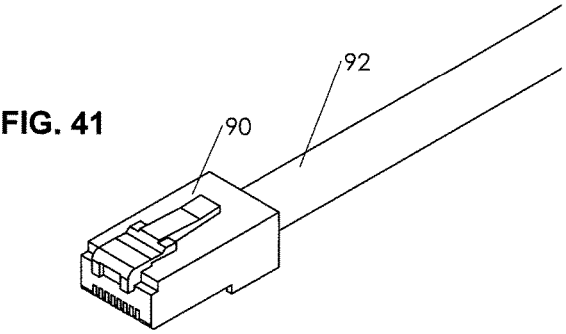
FIG. 41 is a perspective view of an RJ45 connector according to an embodiment.

One type of multi-contact electrical connector that may also work with a connector 10 and housing 12 is an RJ45 connector 90 as shown in FIGS. 38, 39 and 41. As depicted in FIGS. 38 and 39, a clip 650 configured to accommodate an RJ45 connector 90, may fit within the front end 12a of the housing 12. As shown in FIG. 38, the housing 12 may include the catch openings 54 configured to engage with the catch 56 of the clip 650 to retain the clip within the housing. Each side of the housing 12 may include an opening 54 and each side of the clip 650 may include a catch 56.

Figure 40A:
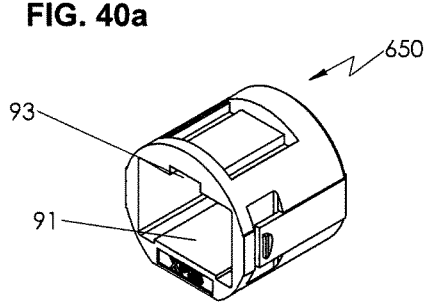
FIGS. 40A and 40B are front and rear perspective views of a clip insert for RJ45 connectors according to an embodiment.
Figure 40B:
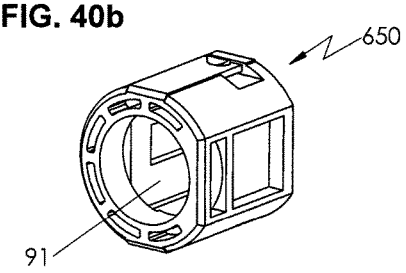

FIGS. 40A and 40B provide detailed top/front and bottom/rear views, respectively, of an embodiment of a clip 650. The clip 650 may include an interior passage 91 having a size configured for receiving the RJ45 connector 90 therein. The RJ45 connector 90, may be connected to multi-strand electrical cable 92, as represented in FIG. 41, to provide a terminal connector for the cable. The RJ45 connector 90 and/or the clip 650 may include engagement features (not shown), such as projections and or corresponding recess for being engaged between the connector and clip to retain the connector within the clip.

Since RJ45 connectors 90 may include a lock/release arm 92 configured with catch members 93, to keep the arms depressed and prevent latching of the catch members in an adapter or other type of connecting device, the clips 650 may include a groove 93 that is configured to receive and maintain the arm 92 in a depressed position as shown when the RJ45 connector is inserted into the clip.

FIGS. 42A and 42B provide assembly views of a connector 10 with a clip 650 having an RJ45 connector 90. FIG. 42A shows a representation of a clip 650 prior to insertion into a housing 12 with a detailed view of the catch 56 and catch openings 54. FIG. 42B provides assembled views of the clip 650 within the housing 12 as components of the connector 10.

Figure 43:
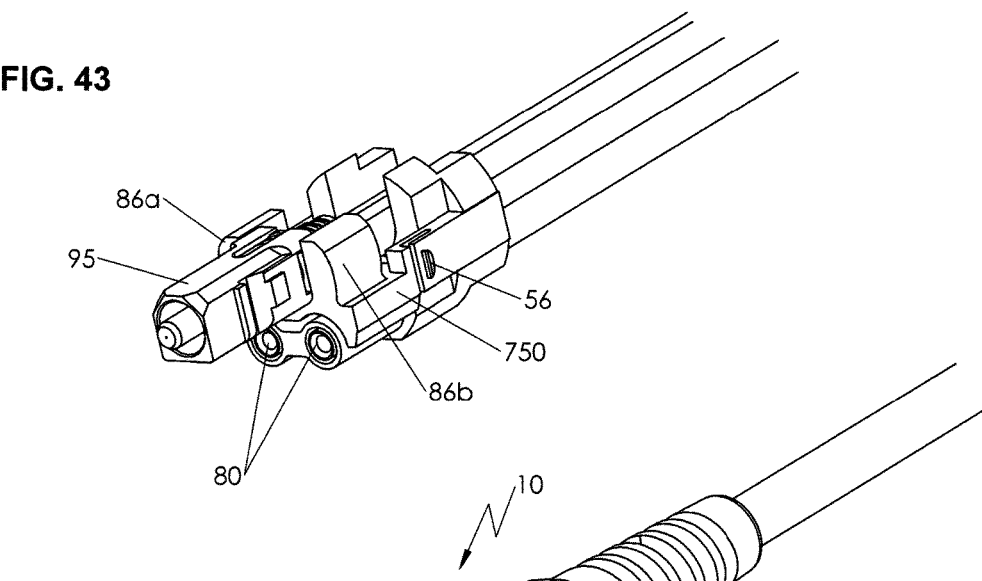
FIG. 43 is a perspective view of a clip insert with an SC connector according to an embodiment.
Figure 44A:
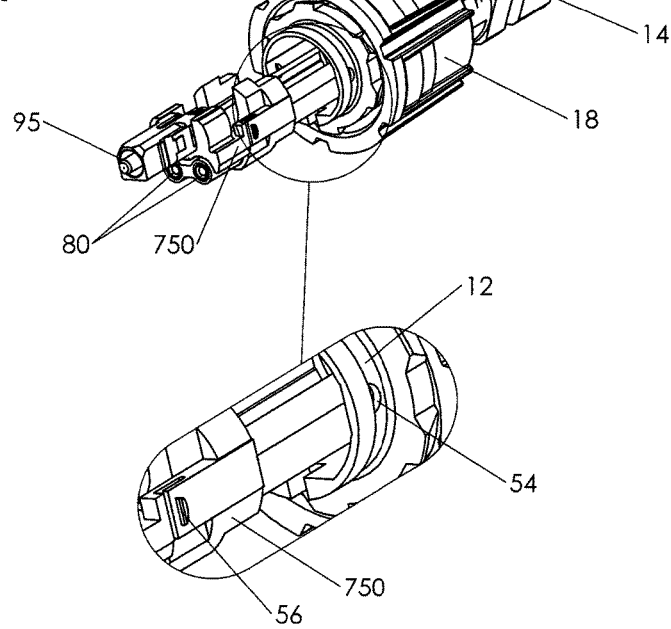
FIGS. 44A-44C are assembly views of an SC clip IP connector according to an embodiment.
Figure 44B:
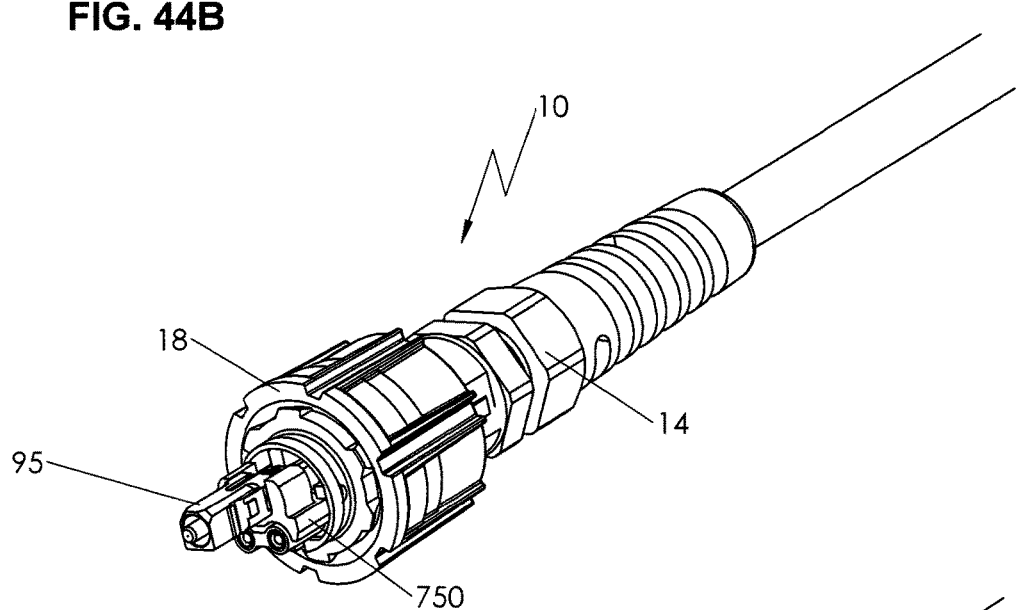
Figure 44C:
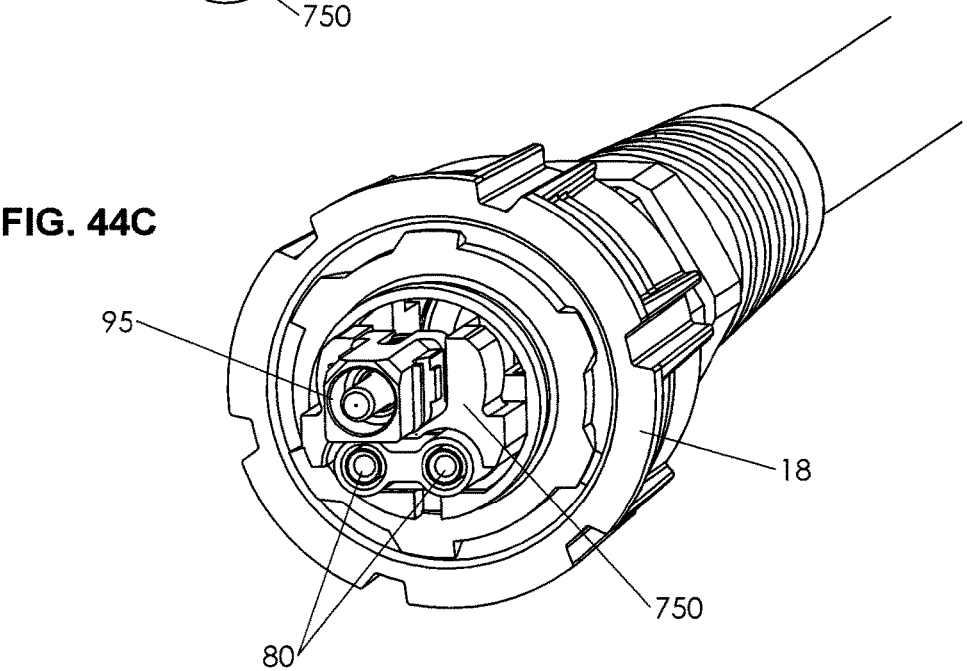

One additional embodiment of clip for a fiber optic connector is represented in FIGS. 43, 44A and 44B. In an embodiment as represented in FIGS. 43, a hybrid SC fiber optic/electric socket clip 750 may be configured to fit within the front end 12a of the housing 12. The hybrid clip 750, as represented in FIG. 43 may be configured to accommodate an SC type fiber optic connector 95 as well as two electrical connectors configured as socket contacts 80. Sockets 80 may be any type of conductive metal, such as aluminum or copper, and may terminate electrical wires (not shown). In alternate variations of the clip 750, the clip may be configured for electrical pins instead of sockets 80, or may be configured for only an SC connector 95 without any electrical contacts.

As discussed previously, a hybrid clip, such as clip 750 may include channels configured for receiving and retaining the sockets 80 therein. Hybrid clips 750 may also include a similar catch member 56 as previously discussed for retaining the clips within the housing 12. A clip 750 may be configured as a one-piece body, and for retention of the SC connector 95 within the hybrid clip 750, the clip may have a pair of opposed bracket arms 86a, 86b extending from a body portion of the clip and spaced apart from one another by a distance sufficient to accommodate the body of the connector therein. A top portion of the arms 86a, 86b may be configured to extend around at least a portion of the body of the SC connector 95 to hold the connector in place, and at least minimize movement of the connector away from the clip 750 in a transverse direction to a longitudinal axis of the clip.

The arms 86a, 86b may be displaceable outwardly away from one another to allow for insertion of the SC connector 90 into the retaining space between the arms. Once the connector 90 is inserted between the arms 86a, 86b, the arms may return to their original position to hold the connector in place. Alternatively, the body of the SC connector may be grooved have a reduced width, and the inner side of the arms 86a, 86b may fit within the groove, whereby with such a configuration the SC connector may be prevented from moving longitudinally within the clip 750.

FIGS. 44A and 44B provide assembly views of a connector 10 with a clip 750 having an SC connector 95 as well as socket contacts 80. FIG. 44A shows a representation of a clip 750 prior to insertion into a housing 12 with a detailed view of the catch 56 and catch openings 54. FIG. 44B provides assembled views of the clip 750 within the housing 12 as components of the connector 10.

Each of the clips 50, 150, 250, 350, 450, 550, 650, and 750 as described above may be configured to have essentially the same external shape about the circumference of the clips so that each of the clips may fit within the same housing 12 and therefore each type of connector accommodated by the clips may use the same connector 10 for connection to an adapter 20. Construction of connectors can therefore be simplified as matching of different parts with different connectors is minimized. Manufacturing costs can be reduced as fewer different parts need to be designed, tooled and constructed, and inventories of parts can also be minimized. All of these factors may result in reduced cost components.

Various parts, components or configurations described with respect to any one embodiment above may also be adapted to any others of the embodiments provided. Various embodiments including LC connectors as described above may be configured with SC connectors, and various embodiments including SC connectors as described above may also be configured with LC connectors.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A connector system comprising:
    a housing having a cable end portion and an opposite connection end portion configured to mate with a receptacle; and
    an insert configured to be removably coupled to the housing;
    wherein the insert is configured to be coupled to at least one optical fiber connector and at least one electrical connector while the insert is removed from the housing to form a hybrid connector insert assembly that fixedly retains the at least one optical fiber connector and the at least one electrical connector within the insert while the insert is removed from the housing;
    wherein the hybrid connector insert assembly is configured to be removably coupled to the housing as a unit by insertion of the hybrid connector insert assembly into the connection end portion of the housing; and
    wherein the connector system is configured to make a hybrid connection after the hybrid connector insert assembly is coupled to the housing when the connection end portion is mated with the receptacle.

2. The connector system of claim 1, wherein the insert is a clip.

3. The connector system of claim 1, wherein the insert includes a catch configured to engage a catch opening of the housing so as to couple the insert to the housing.

4. The connector system of claim 3, wherein the catch is a wedge shaped catch.

5. The connector system as set forth in claim 3, wherein the insert comprises a body portion having an exterior side and the catch comprises an arm having a proximal end attached to the exterior side and a distal end that is spaced apart from the exterior side by a gap.

6. The connector system of claim 1, wherein an interior surface of the housing is keyed to match a corresponding surface of the insert so as to allow coupling of the insert to the housing in a single orientation.

7. The connector system of claim 1, wherein the insert includes a plurality of channels each being configured to receive a respective one of the at least one optical fiber connector and the at least one electrical connector.

8. The connector system of claim 7, wherein at least one of the plurality of channels includes a respective catch configured to engage a recess in a sidewall of a respective one of the at least one optical fiber connector and the at least one electrical connector.

9. The connector system of claim 1, wherein the insert includes a respective tab configured to engage an arm of at least one of the at least one optical fiber connector and the at least one electrical connector.

10. The connector system of claim 1, wherein the at least one optical fiber connector comprises one of a plurality of LC connectors and a plurality of SC connectors.

11. The connector system of claim 1, wherein the at least one optical fiber connector is one of an LC connector, an SC connector and an MPO connector, and the at least one electrical connector is one of a pin contact, an electrical socket and an RJ45 connector.

12. The connector system of claim 1, wherein the hybrid connector insert assembly includes a protective sheath disposed around the at least one electrical connector.

13. The connector system of claim 1, wherein the hybrid connector insert assembly is configured so as to hold the at least one optical fiber connector and the at least one electrical connector in a stacked arrangement.

14. The connector system of claim 1, wherein the hybrid connector insert assembly includes:
a bottom clip portion configured to hold the at least one electrical connector; and
a top clip portion disposed against the bottom clip portion so as to clamp the at least one optical fiber connector therebetween.

15. The connector system of claim 1, wherein the insert includes a plurality of bracket arms configured to hold the at least one optical fiber connector.

16. The connector system of claim 15, wherein the at least one optical fiber connector is an MPO connector.

17. The connector system of claim 1, wherein the housing is configured to removably couple to any one of a plurality of different types of inserts.

18. The connector system of claim 17, wherein the insert comprises a first insert, the plurality of different types of inserts further comprising a second insert configured for being coupled only to at least one optical fiber connector.

19. The connector system of claim 18, wherein the plurality of different types of inserts further includes a third insert being coupled only to at least one electrical connector.

20. The connector system of claim 1, further comprising a coupling nut disposed around the housing.

21. The connector system of claim 20, further comprising an adapter coupled to the housing by the coupling nut.

22. The connector system of claim 20, further comprising a coupling nut lock ring.

23. The connector system of claim 1, wherein the housing comprises a front portion and a rear portion, the rear portion being threaded for receiving a cable strain relief member.

24. The connector system of claim 1, wherein the connector system is an ingress protected connector system, further comprising at least one weather proofing seal.

25. A connector system comprising:
a housing having a cable end portion and an opposite connection end portion configured to mate with a receptacle;
an insert configured to be removably coupled to the housing;
a pair of optical fiber connectors; and
at least one electrical connector comprising a pair of electrical contacts;
wherein the insert is configured to be coupled to the-pair of optical fiber connectors and the pair of electrical contacts while the insert is removed from the housing to form a hybrid connector insert assembly;
wherein the hybrid connector insert assembly is configured such that the optical fiber connectors of the pair of optical fiber connectors are spaced apart from one another along a first axis, the electrical contacts in the pair of electrical contacts are spaced apart from one another along a second axis parallel to the first axis, and the pair of optical fiber connectors are spaced apart from the pair of electrical contacts along a third axis transverse to the first and second axes;
wherein the hybrid connector insert assembly is configured to be removably coupled to the housing as a unit by insertion of the hybrid connector insert assembly into the connection end portion of the housing; and
wherein the connector system is configured to make a hybrid connection after the hybrid connector insert assembly is coupled to the housing when the connection end portion is mated with the receptacle.

26. The connector system of claim 25, wherein the at least one optical fiber connector includes at least one of an LC connector, an SC connector, and an MPO and the at least one electrical connector includes at least one of an electrical pin, an electrical socket and an RJ45 connector.

27. A connector system comprising:
a housing configured to couple to any one of a plurality of different clips, the housing having a cable end portion and an opposite connection end portion configured to mate with a receptacle; and
at least one clip configured to removably couple to the housing;
wherein each one of the at least one clip includes at least one connector configured to removably couple to said one of the at least one clip, the at least one connector including at least one of an optical fiber connector and an electrical connector;
wherein one of the at least one clip comprises a hybrid clip comprising an insert and at least one optical fiber connector and at least one electrical connector coupled to the hybrid clip;
wherein the hybrid clip is configured to be removably coupled to the housing as a unit by insertion of the hybrid clip into the connection end portion of the housing; and
wherein the hybrid clip is configured to fixedly retain the at least one optical fiber connector and the at least one electrical connector within the insert while the insert is removed from the housing;
wherein the connector system is configured to make a hybrid connection when the hybrid clip is coupled to the housing when the connection end portion is mated with the receptacle.

* * * * *